MEMORY SYSTEM

Filed Dec. 30, 1960 8 Sheets-Sheet 1

INVENTORS
HAROLD E. PETERSEN
WILLIAM L. McDERMID
JAMES R. KISEDA
BY Robert E. Sandt
AGENT Nov. 30, 1965 H. E. PETERSEN ETAL 3,221,308

MEMORY SYSTEM

Filed Dec. 30, 1960 8 Sheets-Sheet 3

Nov. 30, 1965 H. E. PETERSEN ETAL 3,221,308

MEMORY SYSTEM

Filed Dec. 30, 1960 8 Sheets-Sheet 8

3,221,308

MEMORY SYSTEM

Harold E. Petersen, Chappaqua, William L. McDermid, Peekskill, and James R. Kiseda, Yorktown Heights, N.Y., assignors to International Business Machines Corporation, New York, N.Y., a corporation of New York Filed Dec. 30, 1960, Ser. No. 79,812
12 Claims. (Cl. 340—172.5)

This invention relates to memory systems and more particularly to a system for interrogating the word content of a memory for the presence of data which either matches or most nearly matches the sought data criteria.

One field of endeavor wherein it is highly desirable to obtain a match or near match to a sought data criteria is in the field of mechanized literature searching. The modern thinking in this area leans toward characterizing documents by so-called "descriptors" or "key-words." These words or concepts are than coded, and either singly or in combination constitute the characteristics of the document. A searcher defines his field of search by designating those descriptors whose presence or absence he desires in the documents he is seeking. The coded descriptors characterizing all of the document in the library are stored in a memory, together with the associated document identification number. By comparison of the search criteria with the memory content, the identification of those documents answering to the posed question can be found and identified. Prior art devices have hitherto serially searched the files. A well-known example is a punched card sorter used for fingerprint identification. Another application is the running of needles through a file of perforated cards for selecting personnel having desired job aptitudes. In all of these systems the flexibility and speed are limited either by the requirement that the file be serially interrogated, or by the inherent speed limitation of handling individual records. A greater drawback found in known systems, however, is their inability to automatically rephrase a question if the prior question fails to produce any response, or too great a response.

Specifically, in mechanized patent searching, patents, and other literature constituting the prior art, are characterized by descriptors which the classifier believes to be pertinent thereto. A subsequent searcher may, for example, ask the machine to deliver all references having the descriptors A, C, F, L, and Q, but to reject any references having B, G, H, or W. Such a question, because of the limitations therein, may produce no response from the file, as no reference fulfills the qualifications. The searcher then broadens his question. A relaxation of his standards of acceptance might, for example, be, that of the five descriptors whose presence he desired (A, C, F, L, and Q), he is willing to accept the presence of any four of the five. This relaxation opens up the search to include five more classes of documents, namely those having respectively ACFL, ACFQ, AFLQ, CFLQ, and ACLQ. A memory system that automatically produces a response such as that just explained, by means of a single parallel interrogation, offers a valuable search tool, not only in this particular environment, but also as a subsystem in a large electronic data processing system for supplying upon demand, any specified data by its data content.

It is therefore an object of this invention to provide a system for interrogating the contents of a memory for a perfect match or nearest match to the sought data criteria.

Another object of this invention is to provide a memory interrogation system wherein the data content of memory is interrogated in parallel for the desired presence of a given configuration of bits, and each interrogated word responds with an analogue manifestation indicative of the degree of match of the word to the sought bit configuration, which analogue manifestation is compared against a pre-determined standard to indicate which of the words possesses an acceptable degree of match.

It is a further object of the invention to provide a program controlled system for interrogating the contents of a memory for the presence of data fulfilling a predetermined standard, and based on the memory's response thereto, apply a succession of given standards thereto, until the desired response is achieved.

Another object is to provide a memory interrogating system wherein the data responding affirmatively to any interrogation is immediately read out of memory.

Yet another object is to provide a programmed interrogation system for a fully associative memory wherein a succession of questions of varying specificity are preordained and the choice thereof is determined by the response of the memory content to the first-posed question.

The foregoing and other objects, features and advantages of the invention will be apparent from the following more particular description of a preferred embodiment of the invention, as illustrated in the accompanying drawings.

Figure 1:
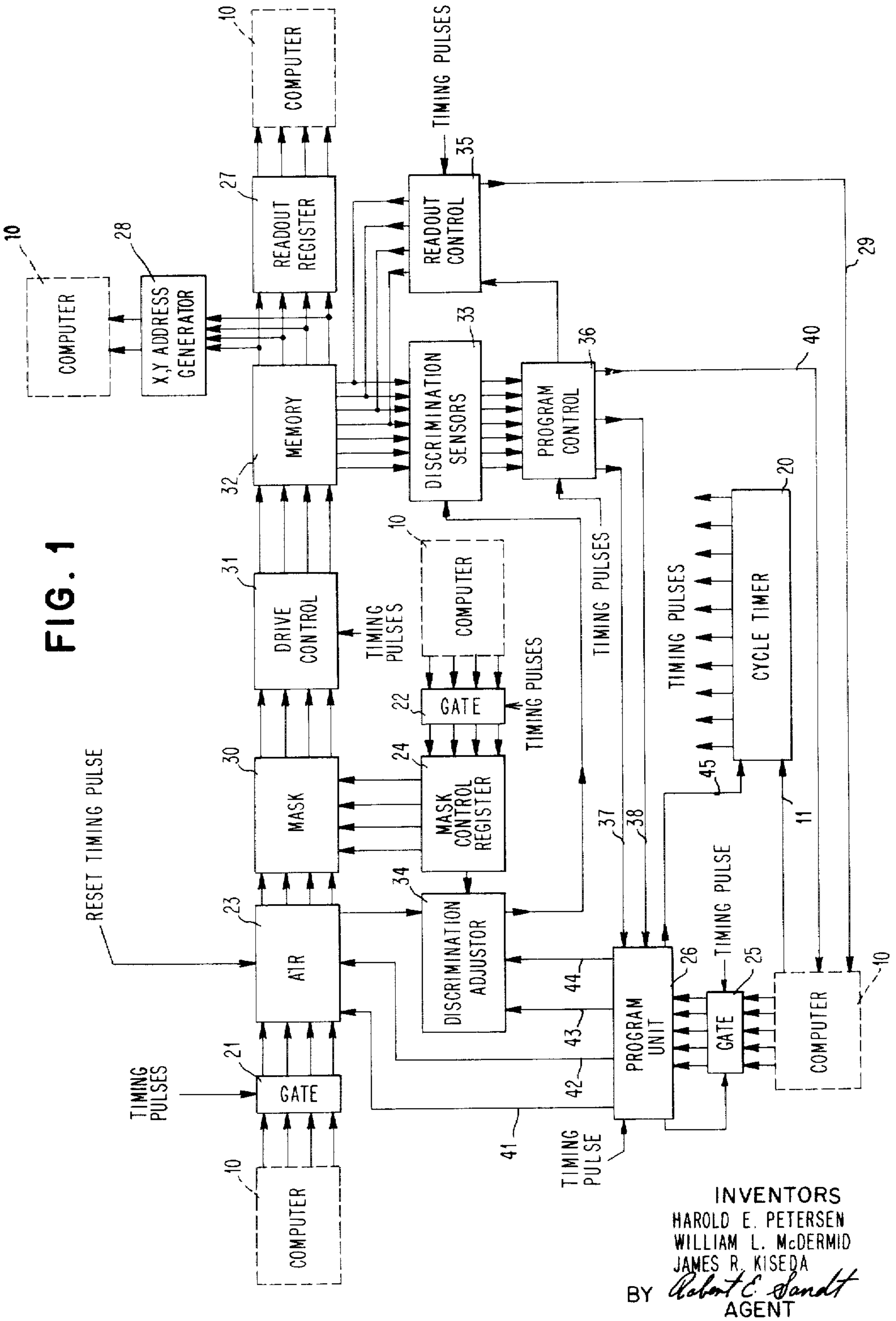
FIG. 1 is a schematic block diagram of the overall system configuration.

*System schematic operation of FIG. 1*

Although in FIG. 1 the memory interrogation system has been shown in conjunction with a large scale electronic data processing system, it will readily be appreciated that, although this is a highly useful association, the memory system can operate independently, provided that questions and instructions from some external source are provided. Any of many external sources logically suggest themselves. Manual keyboards, a punched card reader, remote telegraphic or other communication links, to name but a few, certainly provide useful means for controlling the system now to be described.

In FIG. 1 the computer 10 has been shown as a series of phantom boxes only to provide an uncluttered diagram. The computer should, however, be considered as a functional entity, capable of delivering to the memory system and receiving from it the controls and information hereinafter to be specifically set forth.

Whenever the computer, through its own program control determines that data is required from memory it produces an "initiate search" control impulse on the line 11, which impulse starts the cycle of operation of the memory system as determined by the cycle timer 20. This timer not only controls the memory during its subcycle of operation but also controls the computer 10 during those time intervals when the computer is transmitting information to the memory sub-system, or receiving information therefrom. The specific timing of the system will be described in detail when the system itself is so described. At this point it is sufficient that, upon initiating a search cycle by impulse on line 11, the timer orders the computer to submit its question and instructions. The question is entered from computer 10 through gates 21 and 22 which are opened by impulses from timer 20 respectively into the associative interrogation register (AIR) 23 and the mask control register 24. The AIR receives from the computer a word, the bits of which, in whole or any part thereof, constitute the characteristics or descriptors of the data whose presence is sought in memory. The mask control register receives information as to those orders of the word entered in AIR, wherein the searcher cares or doesn't care what the character of the bits is in those orders. The instructions from computer 10 are passed by gate 25 into program storage unit 26 again by a timing pulse from timer 20. These instructions could be any of several as will be set forth in the subsequent detailed description.

The memory system then proceeds to execute the instructions issued to it and searches for the desired information. During this operation, the memory system can be divorced from the computer, as it proceeds independently thereof. The speed of search, because of its parallel nature, however, is so rapid that the computer can wait for that brief time required for the memory subsystem to search, and then deliver its found data to the computer 10, either through a readout register 27 as a complete data word or through an X, Y address generator 28, which provides the addresses in the main computer memory of the locations of the data sought. When either of these is delivered to the computer a "search completed" signal is delivered to the computer 10 by a signal on line 29, and the computer is freed for further operation. The memory system is idled awaiting the further command of the computer.

The AIR 23 and the mask control register 24 combine their data significance in the mask 30 to control the drive control circuits 31 to interrogate the memory 32. The individual response of each of the words stored in memory 32 are detected by sensors 33. These sensors have a discrimination level which is set by the discriminator adjustor 34 which is jointly controlled by AIR 23 and the mask control register 24 and modified by the program unit 26. The sensors 33 detect the fact that one or more words in memory 32 match the question posed by AIR 23 and mask control register 24, or that no words match the sought question.

The readout control circuits 35 provide for the sequential readout of those words matching the sought criteria. In the event of no-match, the nature of the mis-match is detected by the program control circuits 36 so as to select the necessary modification of the posed question so as to broaden the scope thereof to attempt to achieve a match on such broader question. These no-match conditions are referred to the program storage unit 26 by the lines 37 and 38 which respectively manifest the conditions of "no-match on zeroes," or "no-match on ones." The program control unit also delivers to the computer a signal on line 40 in the event no word is found matching all programmed instructions.

The program unit 26, in accordance with the instructions received from computer 10 and under control of the response of the data words in memory 32, as evaluated by the program control unit 36, control the AIR 23, over lines 41 and 42, to add one or subtract one from that register. Similarly over line 43 or 44 the program unit 26 can control the discrimination adjustor 34 to relax the discrimination level for matches on "1's" or "0's." The control indicated by line 45 (actually a plurality of connections) from the program unit to the cycle timer 20 provides the necessary selection of the various subcycles that are provided by the timer.

*General logic and definitions*

So as to achieve a greater appreciation of the significance of the foregoing functions, it is well to digress and examine a few of the fundamental data aspects and definitions. A fully associative memory, as it is used in this specification, is one in which a data record is retrieved, not by its location or address, but by specifying the information content of any arbitrary portion of the sought word, the memory words being interrogated in parallel for their data content. Thus, for example, a memory having a bit capacity of 100 bits can be interrogated for all combinations of those bits. Furthermore, since both the presence and absence of any data bit has significance, any one or more orders of the 100 bits may be deemed to be non-significant, namely the searcher doesn't care whether there is a zero or one in the thus designated orders.

By way of a simple example, let it be assumed that the memory is shrunk to 4 bits, each of which designates the presence or absence of the designators A, B, C, and D by a one or zero. For a complete storage of the sixteen possible words, one response, and one response only, will be had for a complete interrogation of four bits. If any one of the four bits is deemed to be non-significant, then, for each question posed, two memory data words will respond. It will thus be readily appreciated that non-significance has a different logical connotation from the absence of a characteristic. For example, if one were seeking a document characterized by the desired presence of designators A and B, and the desired absence of C and D he would pose 1100 as the question, and only the word 1100 would respond. On the other hand, if he wanted A and B, and didn't care whether C and D were present or not, he would only ask for the presence of A and B, and the words $AB\overline{C}\overline{D}$, $AB\overline{C}D$, $ABC\overline{D}$, and ABCD would all respond to the interrogation. If the searcher, desiring the presence of A and B and the absence of C and D and failing to find a response to $AB\overline{C}\overline{D}$, might pose his question as follows, "Give me A and B and the absence of C *or* D." By means of adjusting the discrimination level, as will be hereinafter explained, the memory will deliver to him $AB\overline{C}D$ and $ABC\overline{D}$ but will reject ABCD, as both C and D are present.

Another near match criterion that could be applied would be an inventory search for 5000 items of a given description and price. It is conceivable that an insufficient quantity of parts of that description is in stock. The person requesting same can then seek substitute items by adopting a don't care attitude with respect to the plating for example. This is similar to the previous example. On the other hand, he may have sought his item on the basis of a unit price of $1.00 or less, as an arbitrary cost figure, and is willing to relax his standards in this area. His program would then call for adjusting the pertinent orders of the AIR progressively to manifest $1.01, $1.02 etc. until a match is found, or until a fixed price limit is achieved.

A final program variation brought into action when it is found that the searcher's question, as well as the less limiting versions thereof, produce no response, is that of changing the whole of the question. This operation requires that the memory sub-system indicate to the computer that none of the questions produced a match and request further instructions. The computer program, or the human searcher, can abide by the decision that there is no pertinent prior art or rephrase his question so as to attack the art from a totally different aspect.

Thus, question modification can be achieved by (1) adjusting the mask, (2) adjusting the discrimination level or (3) adding or subtracting counts from the associative interrogation register (AIR).

*Memory*

The memory per se employed in the instant system is described in detail in the co-pending application of H. E. Petersen and J. R. Kiseda, Serial No. 61,238 filed October 7, 1960. Basically, it employs bi-stable bit storage elements arranged in a matrical array. These elements are pre-established in one or the other of their stable states to manifest the respective bits of the stored data words.

A common interrogation and readout line is connected with each storage element storing the corresponding bit of all the stored data words. Similarly a common sense and drive line is connected with each storage element storing all of the bits of any one word. Thus there are as many individual bit lines as there are bits in the stored data words, and as many word lines as the word capacity of memory. In the referenced application, and in FIG. 2*b* of this application, the bi-stable elements chosen are magnetic toroidal cores having a substantially square hysteresis loop. The cores are pre-established in their positive or negative remanent states to store the respective "1" or "0" bits constituting the stored words. When an interrogation signal is applied to any bit winding, the cores coupled thereby will respond with a signal indicative of a match or a mis-match of the remanent state of the core with respect to the nature of the interrogation signal. Because, the cores must be non-destructively interrogated, the technique taught by Newhouse in the Proceedings of the IRE for November 1957, at pages 1484 to 1492, is employed. Each core's response to the interrogation is manifested in the corresponding word line coupled thereto. In the prior application interrogation was serial by bit for zeroes, followed by an interrogation serial by bit for ones. Thus, each bit core in each word produced a unique response on its own word line. The first-occurring mis-match of any core on a word line was stored, and could not be negated by any number of subsequently occurring matches. The lack of mis-matches on any word line indicated a match. In that application, as here, any one core storing a "0," and interrogated for the presence of a "0" produces a response of having a magnitude of $-a$ volts. The same core storing a "0" and interrogated for a "1" produces a response of $+b$ volts. Conversely a core storing a "1" and interrogated for the presence of a "1" responds with a voltage of $+a$, while a stored "1" interrogated for a "0" responds with $-b$. In all instances the absolute magnitude of $b$ is greater than $a$, the ratio of $b/a$ being at least greater than 4, and preferably much larger. An ideal square loop material would have an infinite ratio.

Whereas the previous application interrogated each bit line serially, the present system interrogates the bit lines in parallel, first for zeroes and then for ones. With such interrogation the word line responds to the parallel interrogation is the sum of the individual responses of each interrogated core. If the following notation is adapted, wherein:

(a) The primed zeroes or ones indicate the polarity of the interrogated signal;

(b) The unprimed zeroes or ones indicate the remanent storage state of a single interrogated core;

(c) The arrow indicates that the signal is interrogating a core set in the state of the digit at the head of the arrow;

(d) The symbol ($\approx$) means "yields."

The responses of a single core in each of its respective remanent states to the two kinds of possible interrogation will be:

$$0'\rightarrow 0\approx -a \qquad 1'\rightarrow 0\approx +b$$
$$0'\rightarrow 1\approx -b \qquad 1'\rightarrow 1\approx +a$$

Since interrogation proceeds simultaneously first for the presence of zeroes, followed by the presence of ones, and the response of any single word line is the summation of the responses of all the interrogated cores thereon, it will be appreciated that for any desired combination of N bits, a matching response for the respective interrogations will be:

Interrogating for X Zeroes $\approx -Xa$ (matching response)

Interrogating for N–X Ones $\approx +(N-X)a$ (matching response)

The bias or discrimination levels of the sensor circuits connected to each word line are set to a level somewhat more than those determined by the foregoing expressions. Any response in excess of that preset level indicates a mis-matching word. For example, if one interrogates for the presence of X zeroes in X given orders, and a word in memory contains all but one of those zeroes, then that one mis-matching core will yield $-b$. The summation response will be $-b-(X-1)a$. Since $b>a$, the negative voltage response yielded by X cores, having one mis-matched, will be greater negatively than the $-Xa$ bias, and the sensor will be activated to detect a mis-match. The interrogation for the presence of N–X ones, even though it produces a match, is of no significance, as the mis-match on zeroes was sensed and stored. The lack of a mis-match must occur in both interrogations for zeroes and ones in order to have a total match. Only those orders, wherein the presence of a zero is desired are interrogated for zeroes, and similarly, for the presence of ones. If it is not significant whether any given order contains a zero or a one, that order is not interrogated. Consequently, the cores linked by non-interrogated bit lines produce no response.

Inasmuch as the nature of the interrogation is known, it becomes necessary to count the number of zeroes whose presence is required in the matching word and set the discrimination level accordingly. As has been shown, any one mis-match will produce a response in excess thereof. Similarly a count of ones is effected, and the bias level separately set for the interrogation for the presence of ones. No mis-matching word can respond to both the zero and one interrogation, although it may respond affirmatively to either.

In the following tables the general expressions hereinabove set forth have been specifically reduced to interrogation of three bit positions for all combinations of zeroes and ones, there being eight words interrogated in parallel, which words represent all of the combinations of three bits. The first vertical column of primed zeroes or ones indicate that which is being sought in memory. The second vertical column indicates the respective bias levels which would be established for each respective interrogation. The unprimed zeroes and ones combinatorially arranged in the top row denote the eight words stored in memory. The matrical array of $a$'s, $b$'s, and 0's indicate the total response of any word to the respective interrogation. By visual comparison of the response of any word to the bias level for any interrogation it can be readily seen that only a perfectly matching word will respond to the successive interrogations for zeroes and ones.

*Interrogation for zeroes.—Word in memory*

| Looking For— | Bias Level | 000 | 001 | 010 | 011 | 100 | 101 | 110 | 111 |
|---|---|---|---|---|---|---|---|---|---|
| 0'0'0' | $-3a$ | $-3a$ | $-2a-b$ | $-2a-b$ | $-a-2b$ | $-2a-b$ | $-a-2b$ | $-a-2b$ | $-3b$ |
| 0'0'1' | $-2a$ | $-2a$ | $-2a$ | $-a-b$ | $-a-b$ | $-a-b$ | $-a-b$ | $-2b$ | $-2b$ |
| 0'1'0' | $-2a$ | $-2a$ | $-a-b$ | $-2a$ | $-a-b$ | $-a-b$ | $-2b$ | $-a-b$ | $-2b$ |
| 0'1'1' | $-a$ | $-a$ | $-a$ | $-a$ | $-a$ | $-b$ | $-b$ | $-b$ | $-b$ |
| 1'0'0' | $-2a$ | $-2a$ | $-a-b$ | $-a-b$ | $-2b$ | $-2a$ | $-a-b$ | $-a-b$ | $-2b$ |
| 1'0'1' | $-a$ | $-a$ | $-a$ | $-b$ | $-b$ | $-a$ | $-a$ | $-b$ | $-b$ |
| 1'1'0' | $-a$ | $-a$ | $-b$ | $-a$ | $-b$ | $-a$ | $-b$ | $-a$ | $-b$ |
| 1'1'1' | 0 | 0 | 0 | 0 | 0 | 0 | 0 | 0 | 0 |

*Interrogation for ones.—Word in memory*

| Looking For— | Bias Level | 000 | 001 | 010 | 011 | 100 | 101 | 110 | 111 |
|---|---|---|---|---|---|---|---|---|---|
| 0′0′0′ | 0 | 0 | 0 | 0 | 0 | 0 | 0 | 0 | 0 |
| 0′0′1′ | $+a$ | $+b$ | $+a$ | $+b$ | $+a$ | $+b$ | $+a$ | $+b$ | $+a$ |
| 0′1′0′ | $+a$ | $+b$ | $+b$ | $+a$ | $+a$ | $+b$ | $+b$ | $+a$ | $+a$ |
| 0′1′1′ | $+2a$ | $+2b$ | $+a+b$ | $+a+b$ | $+2a$ | $+2b$ | $+a+b$ | $+a+b$ | $+2a$ |
| 1′0′0′ | $+a$ | $+b$ | $+b$ | $+b$ | $+b$ | $+a$ | $+a$ | $+a$ | $+a$ |
| 1′0′1′ | $+2a$ | $+2b$ | $+a+b$ | $+2b$ | $+a+b$ | $+a+b$ | $+2a$ | $+a+b$ | $+2a$ |
| 1′1′0′ | $+2a$ | $+2b$ | $+2b$ | $+a+b$ | $+a+b$ | $+a+b$ | $+a+b$ | $+2a$ | $+2a$ |
| 1′1′1′ | $+3a$ | $+3b$ | $+a+2b$ | $+a+2b$ | $+2a+b$ | $+a+2b$ | $+2a+b$ | $+2a+b$ | $3a$ |

The previous discussion has been confined to the perfect match condition, which condition is certainly desirable, if one has properly phrased his question. However, as such might be characterized as the exception rather than the rule, the apparatus to be described can be adjusted to be progressively less discriminating. If for example, and employing the previous notation:

$$0'1'0' \rightarrow 011 \simeq -a-b \quad \text{(for Zeroes)}$$
$$0'1'0' \rightarrow 011 \simeq +a \quad \text{(for Ones)}$$

the interrogation fails to match on zeroes, but does match one ones, and the discrimination level was expanded, so that the zero bias level is increased negatively to the value of $-a-b$, the word 011 will now match. So also will the word 110 match. The relaxed criterion for match is now that the presence of a one is required in the middle order, and a zero in either, but not both, of the extreme orders. This criterion is opposed to the "don't care" criterion, which, to obtain the same results, would require two interrogations, successively applying a "don't care" attitude to the first and third orders. Were "don't care" applied simultaneously to both the first and third orders, and the presence of a one sought only in the middle order, then the words 010, 011, 110, and 111 would all respond. However, should the search so dictate, such operation can be performed.

*Detailed operation*

Figure 2A:
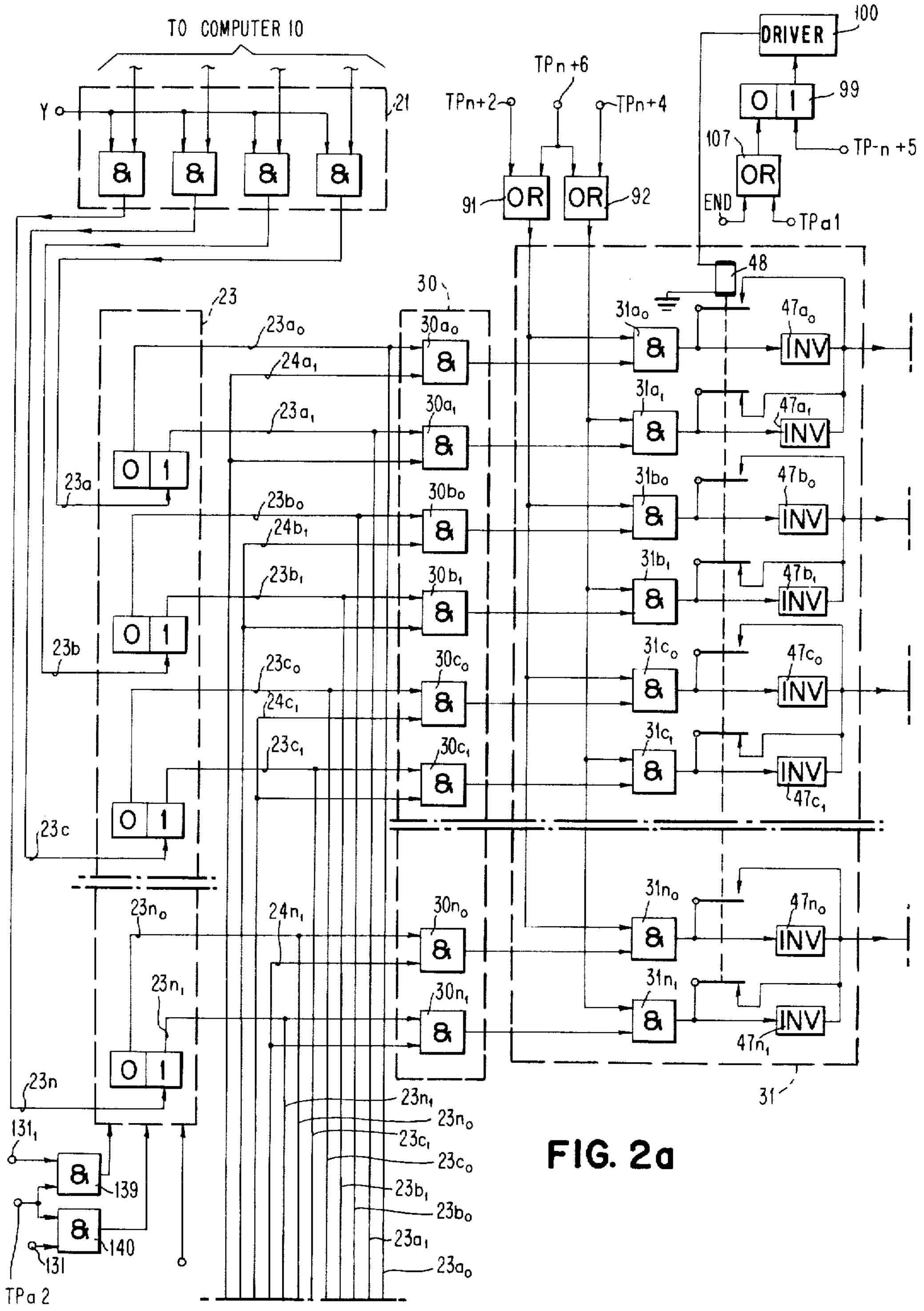
FIG. 2 shows the relative disposition of FIGS. 2*a* through 2*e* constituting the detailed structural arrangement of the schematically-shown components of FIG. 1
Figure 2B:
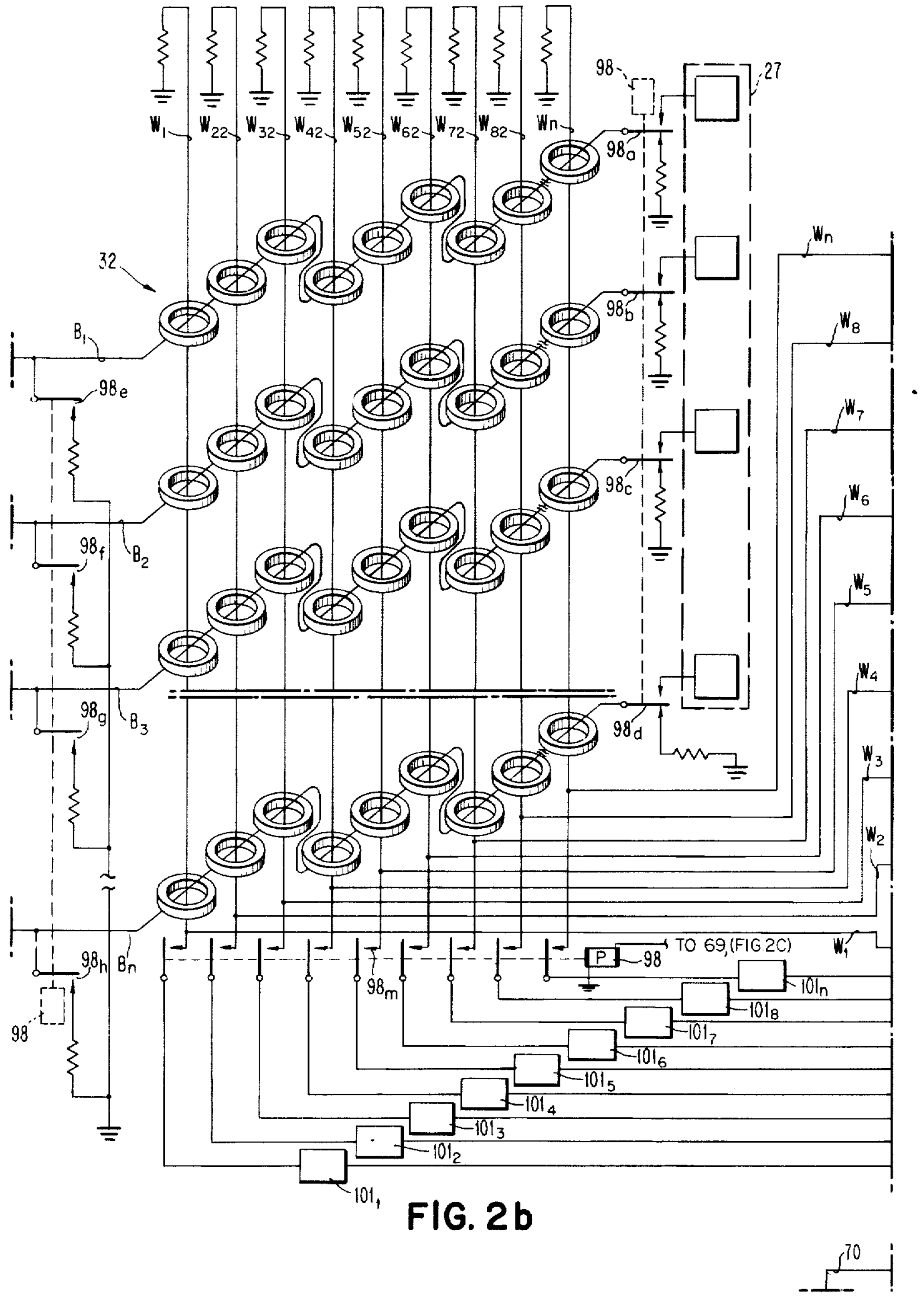

Turning now to the specific implementation of the functional blocks shown in FIG. 1, the associative interrogation register (AIR) 23 therein shown is repeated in FIG. 2*a* under the same reference symbol. Here it is shown as a four order register with a break between the third and fourth orders to indicate that the register can be constructed to any bit capacity. The AIR 23 contains separate bi-stable elements for each bit order connected as a reversible counter. The register or counter 23 has controls $\mathbf{131_1}$, $\mathbf{131_2}$, and W, which respectively control the counter to count up, count down, and reset. The respective lines 23*a*, 23*b*, 23*c*, 23*n* are individual ordered inputs to the respective orders of the register 23. Following reset of the register 24 by control applied to W, which restores all of the bi-stable elements to their "0" state, individual control impulses selectively applied to the lines 23*a* to 23*n* sets the bi-stable elements to the"1" state. The respective stability states of the bi-stable elements in the register 23 delineate the control word constituting a portion of the criterion for interrogation. Entry of this control word into AIR 23 is through gate 21 having individual "and" gates having a common timing input Y, and individual ordered inputs to each of the respective "and" gates. These inputs are cabled to computer internal storage, and receive the interrogation word therefrom when a control impulse is applied to the Y terminal at a time determined by the timer hereinafter to be described.

A further interrogation criterion, namely the "don't care" is applied to the mask control register 24 through a gate 22. The mask control register contains a plurality of ordered bi-stable elements disconnected from one another but having a common reset line 24*r*, which resets all of the individual bi-stable elements 24*a* to 24*n* to their "0" states. The gate 22, like gate 21, has individual "and" gates 22*a* to 22*n* which receive a timed impulse in common from "or" gate 26 so as to gate individual set pulses from computer storage into the "1" side of the respective bi-stable elements 24*a* to 24*n*. The mask control register 24 determines which of the bit positions of memory have significance and shall be interrogated. Only those orders in which it is "cared" whether a given "0" or "1" exists (as determined by AIR 23) are interrogated. If a "1" exists in any given element 24*a* to 24*n* of the mask control register 24, the corresponding bit position shall be interrogated for whatever bit the AIR 23 determines shall be sought in that same order.

Both AIR 23 and the mask control register 24 have outputs which are combined in the mask 30 to determine the total character of the question to be asked of the memory content. This combining function occurs whether the memory is executing an initial inquiry or a relaxed inquiry. As the memory is to be interrogated only in those "care" orders, and the mask control register 24 indicates a "care" by the presence of a "1," the individual elements 24*a* to 24*n* of this register have outputs only from the "1" sides thereof. The AIR 23, however, has outputs from both sides of its respective ordered elements 23*a* to 23*n*, as both zeroes and ones have significance when a word is being sought in memory. Thus each respective order of mask 30 is provided with two "and" $\mathbf{30}a_0$, $\mathbf{30}a_1$, $\mathbf{30}b_1$-----$\mathbf{30}n_0$ and $\mathbf{30}n_1$. Each of these "and" gates has one input from the "0" or "1" output of the individual elements of AIR 23 and an input from the "1" output side of the mask control register 24. Thus "and" gate $\mathbf{30}c_0$ has inputs $\mathbf{23}c_0$ and $\mathbf{24}c_1$, while gate $\mathbf{30}c_1$ has inputs $\mathbf{23}c_1$ and $\mathbf{24}c_1$. Characteristic of any "and" gate $\mathbf{30}a_0$ to $\mathbf{30}n_1$ require two inputs to produce a single output. Since the bi-stable elements in AIR 23 cannot assume two stable states simultaneously, no two "and" gates in the same order can be activated simultaneously. This translated into logic simply means that, as to any one bit position, the question can ask for a "0" or a "1," but not both. Superimposed on that criterion is the "care" or "don't care" imposed by the mask control register 24. Only if AIR 23 contains a "0" in the first order, and the mask control register 24 contains a "1" in the first order, will the respective lines $\mathbf{23}a_0$ and $\mathbf{24}a_1$ be simultaneously energized so as to activate gate $\mathbf{30}a_0$. Gate $\mathbf{30}a_1$, although it has line $\mathbf{24}a_1$ active as an input, lacks an active line $\mathbf{23}a_1$, so that this gate remains inactive. Thus, the first order will be interrogated for the presence of a zero, but will not be interrogated for the presence of one, as such is not wanted. Similarly, if, for example, the third order is a "don't care" order, register order 24*c* will be in the zero state and no output will result on line $\mathbf{24}c_1$. Consequently neither "and" gate $\mathbf{30}c_0$ nor $\mathbf{30}c_1$, can be active, despite an input from the appropriate "*c*" position of AIR 23. The third bit position will therefore not be interrogated.

Each output from the respective "and" gates $\mathbf{30}a_0$ to $\mathbf{30}n_0$ is connected as an input to a corresponding "and" gate $\mathbf{31}a_0$ to $\mathbf{31}n_0$. The second inputs to these latter gates are paired so that there is a single common input to $\mathbf{31}a_0$, $\mathbf{31}b_0$, $\mathbf{31}c_0$ and $\mathbf{31}n_0$, and a second common input to $\mathbf{31}a_1$, $\mathbf{31}b_1$, $\mathbf{31}c_1$, and $\mathbf{31}n_1$. These commoned second inputs permit the simultaneous interrogation for zeroes in those orders wherein a zero is desired, followed by a request for ones. These commoned second inputs terminate in the respective "or" gates 91 and 92 having timing pulse input hubs *TP—n+2*, *TP—n+4* and *TP—n+6* correspond to the times at which they are respectively energized by the timer as will be described. The circuits within the dotted box 31 constitute driver circuits which apply signals to the bit lines to interrogate the statuses of the cores connected thereto. Necessarily these signals must be different for a zero and one interrogation. Polarity is an obvious expedient, and such is in fact employed. The respective "0" interrogation signals are passed through individual inverters 47$a_0$, 47$b_0$, 47$c_0$, and 47$n_0$ so as to produce an inverted interrogation for zeroes. The respective "1" interrogation signals by-pass their respective inverters 47$a_1$, 47$b_1$, 47$c_1$, and 47$n_1$, which latter inverters are used only for core reset. The respective points of relay 48 controlling the inverters are normally open on the "0" side and closed on the "1" side, so that the "0" inverters are normally active.

The individual output lines $B_1$ to $B_n$ from the driver 31 can have any one of three conditions namely, a negative interrogation signal during the zero interrogation cycle, a positive interrogation signal during the one interrogation, or no signal for a "don't care" during both interrogation signals. The pulse magnitude and duration, either positive or negative, is such that the status of the cores can be interrogated non-destructively as taught by Newhouse.

Each of the output lines $B_1$ through $B_n$ is a bit line and threads that one core of each word in memory storing the corresponding bit. Thus in FIG. 2*b* bit line $B_1$ threads nine cores in as many words, each of these cores storing the first bit. Similarly a common word line for each of nine words threads all of the cores storing the its of each of the words. Thus, the response of any core to an interrogation placed on a bit line will be manifested in the word line threaded therethrough. Since a word line threads all of the cores in one word, and more than one bit line is interrogated simultaneously, the word line will add the responses of all of the interrogated cores connected thereo. The response will be in accordance with the equations previously established and illustrated in tabular form for three bits.

The detection of a match or no-match condition on any word line requires that the sensing circuits connected thereto be set to a predetermined bias or discrimination level, which level is succesisvely set for the zero and the one interrogation, and as a function of the number of respective zeroes and ones whose presence is sought in memory. The general relationships previously set forth are valid here. In summary the following simple tabular relationship can be established.

| Number of Zeroes Sought | 0 Bias Level | Number of Ones Sought | 1 Bias Level |
|---|---|---|---|
| 0 | 0 | 0 | 0 |
| 1 | $-a$ | 1 | $+a$ |
| 2 | $-2a$ | 2 | $+2a$ |
| 3 | $-3a$ | 3 | $+3a$ |
| 4 | $-4a$ | 4 | $+4a$ |
| 5 | $-5a$ | 5 | $+5a$ |
| N | $-Na$ | N | $+Na$ |

The establishment of the zero bias level and one bias level becomes then a matter of counting the number of significant zeroes and significant ones. To this end a zeroes counter 50 and a ones counter 51 are provided in FIG. 2*d*. These counters are provided with a common reset input line 53 which resets all orders of the counter to zeroes. Separate inputs 50*a* and 51*a* are provided with sequences of pulses measuring the respective count of zeroes and one that shall be utilized in interrogating the memory. This requires that cognizance be taken of both the bit statuses of the individual orders in AIR 23 and the significance of the orders as determined by the mask control register 24 as only significant zeroes and ones determine the count and the bias. Therefore the outputs 23$a_0$, 23$a_1$, 23$b_0$, 23$b_1$ - - - - 23$n_0$, and 23$n_1$ are led as inputs to the respective "3-way and" gates 52$a_0$, 52$a_1$, 52$b_0$, 52$b_1$ - - - - - - - 52$n_0$, and 52$n_1$, such that the "0" outputs are connected to the "0" inputs of the respective "and" gates as well as the "1" outputs being connected to the "1" inputs. A second input to the "3-way and" gates is from the respective outputs of the mask control register, the connections being correlated bit by bit with those from AIR 23, each output from the mask control register feeding two correspondingly ordered "3-way and gates." The third input to each of these "and" gates is a timing pulse applied sequentially to each of the orders of gates, the corresponding "0" and "1" gates receiving a simultaneous pulse. These pulses are generated by the timer and applied to the hubs TP–1, TP–2, TP–3, TP–*n* at times to be described. The line connected to TP–1 for example is connected to 52$a_0$ and 52$a_1$ so that the presence of a zero or one (there can't be both) will bo counted in the appropriate counter. So as to combine the responses of any one of the "3-way and gates" to provide a sequential count of zeroes and ones, the outputs of the "and" gates 52 are combined in a "0" "or" gate 53 and in a "1" "or" gate 54, the outputs from which are connected respectively to the bit counters 50 and 51. The counters 50 and 51 are conventional reversible binary counters having ordered outputs from the "1" side of each of the bi-stable elements cascaded to form the counter. Thus the counts in these counters are represented by the presence or absence of potentials on the ordered taps in well known combinatorial fashion. These outputs from counter 50 are passed in parallel by "and" gates 55$_1$, 55$_2$, 55$_4$, and 55$_8$ (FIG. 2*e*) to a summing amplifier 56 which produces a voltage manifestive of the decimal equivalent of the binary notation stored in counter 50. Summing amplifiers of this type are well known, for example see Electronic Analogue Computers by G. A. and T. M. Korn, 2nd edition, McGraw-Hill Book Co., 1956 at page 14 et seq. and also Pulse and Digital Circuits, Millman and Taub, same publisher, 1956 at page 26. Generally, they comprise resistance networks weighted according to the binary values and connected so as to add voltages. Thus the relationship of a constant multiplied by the desired number of zeroes shall be produced by this circuitry. So too, shall the ones be counted and their count be passed by "and" gates 57 to a similar summing amplifier 58. As interrogation for zeroes produces a negative core response, the inverter 59 produces a negative bias, the magnitude of which is determined by summing amplifier 56.

As interrogation proceeds first for zeroes and then for ones, the bias corresponding thereto must be sequentially applied. To this end a trigger 60 receives a timing pulse *TP—n+1* to set it in the "1" state thus activating the "and" gates 55 to establish the bias potential, and through driver 61 and relay 62 to connect the bias thus established to the bias set line 70. A later timing pulse *TP—n+3* resets trigger to "0" and removes the bias from line 70. A similar circuit including trigger 63, driver 64, and relay 65 applies the "1" bias to line 70. It is noted that the biases on line 70, controlled by triggers 60 and 63, are applied respectively at times *TP—n+1* and *TP—n+3* and removed respectively at times *TP—n+3* and *TP—n+5* so that they are fully available at times *TP—n+2* and *TP—n+4* when the respective interrogations take place.

Additional bias producing counters 80 and 81 (FIG. 2*d*) are provided to produce the respective "0" and "1" mis-match biases when the discrimination level is to be relaxed to permit match registration if one or more zeroes or ones mis-match. Normally these counters are reset to zero by common reset line 53, and remain so set until relaxed questioning is to be effected. By application of a single pulse to line 82, the counter 50 will have one subtracted therefrom, and the counter 80 will have one added thereto. If, for example, counter 50 had a count of nine, indicating that nine zeroes were sought, and line 82 impulsed once, counter 50 will have eight standing therein, while counter 80 will have one therein. The ultimate bias applied to line 70 will therefore be $-8a-b$. The summing amplifier 56 through "and" gates $\mathbf{84_1}$ and $\mathbf{84_2}$ provides the necessary "$b$" bias in accordance with the count in counter 80. The relaxation of standards for ones is manifested through counter 81, "and" gates $\mathbf{85_1}$ and $\mathbf{85_2}$, and summing amplifier 58.

Figure 2C:
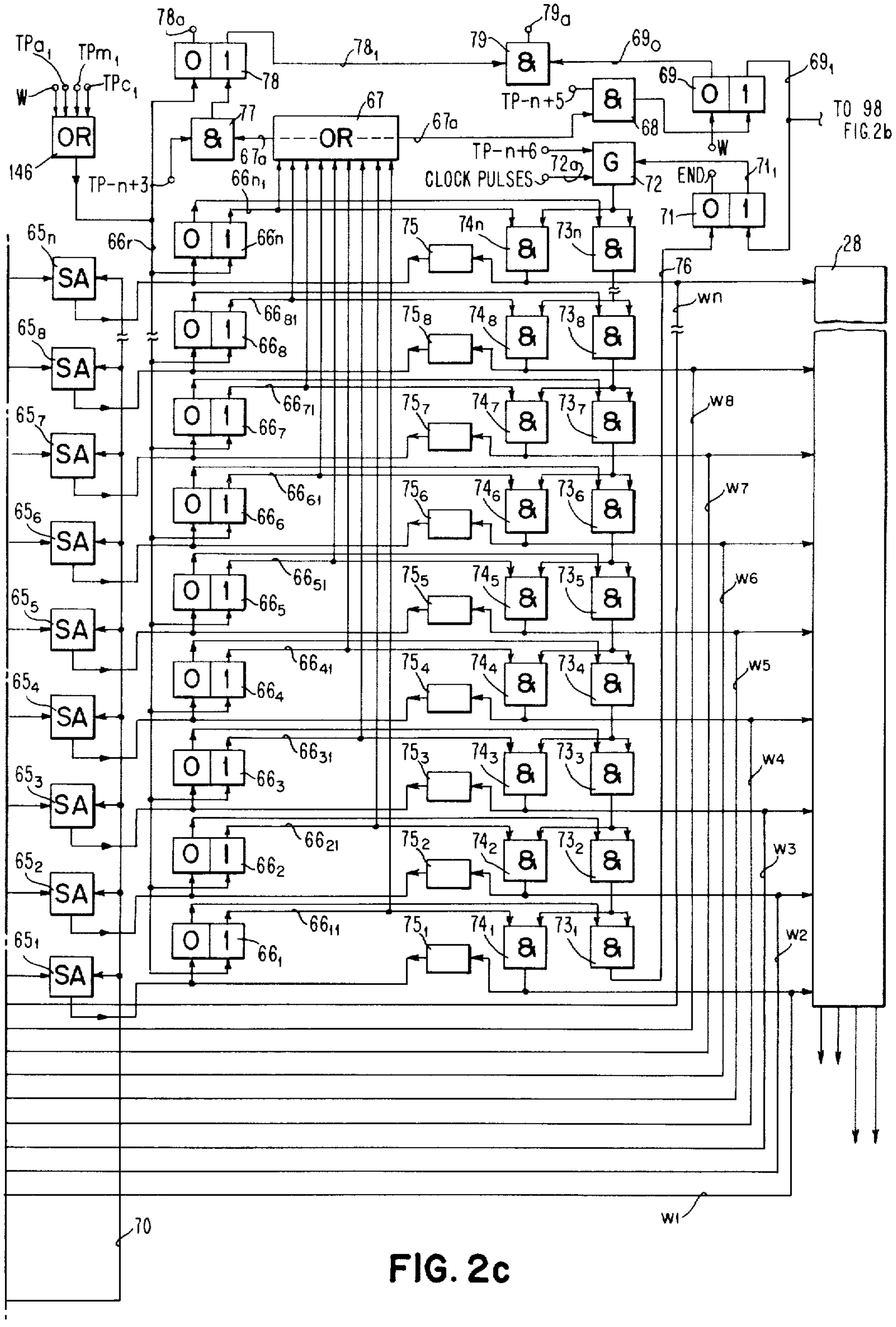
Figure 2D:
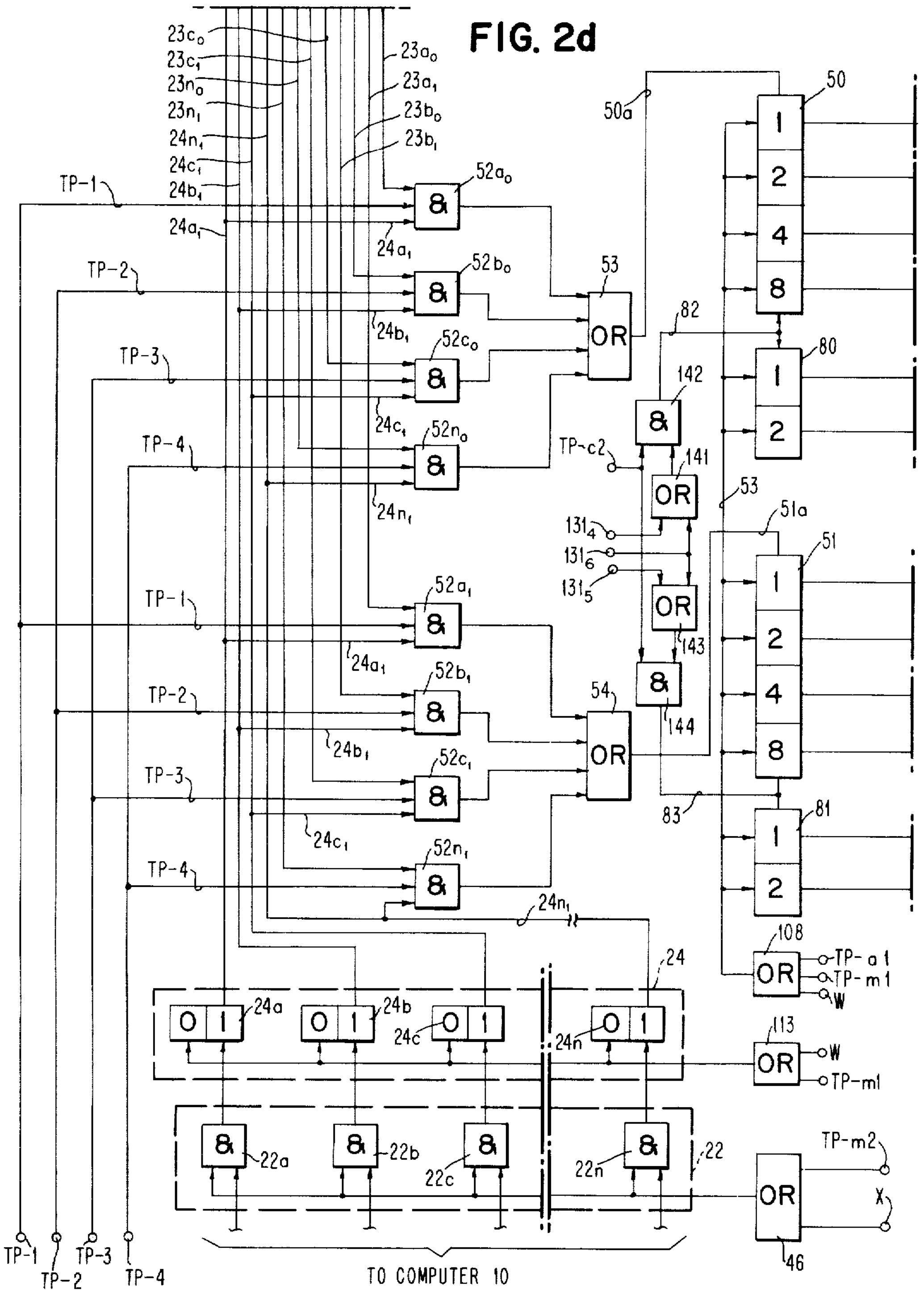
Figure 2E:
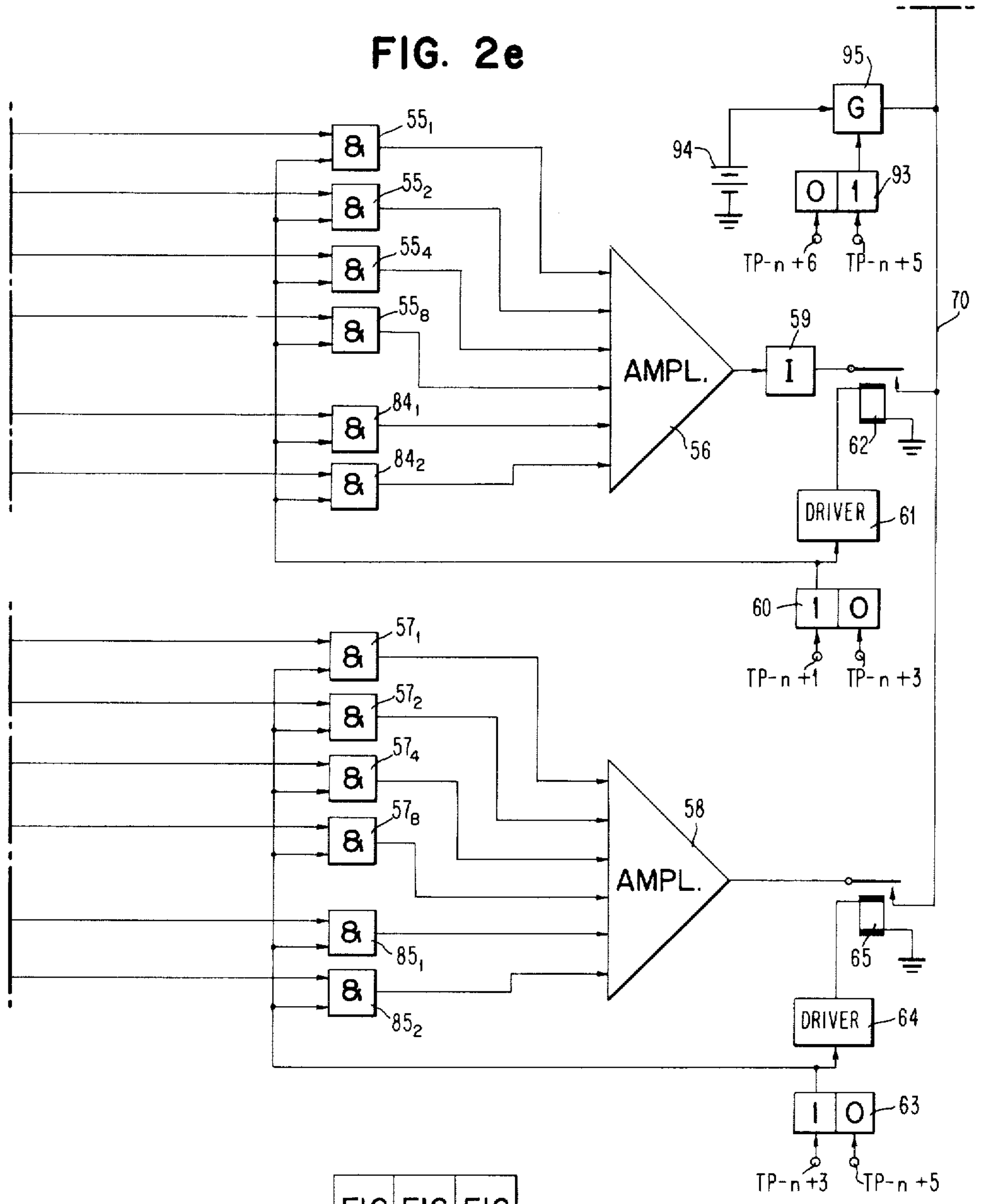
Figure 2:
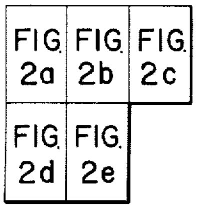

The line 70 is connected in parallel to all of the sense amplifiers $\mathbf{65_1}$ to $\mathbf{65_n}$ (FIG. 2*c*). These sense amplifiers have the capability of producing an output signal only when the signal is greater in magnitude than the cutoff bias applied, which bias is determined by the tabular values, supra, and produced by summing amplifiers 56 and 58. Thus, for example, if one sought and found three zeroes the bias would be set at $-3a$, and the interrogated cores would respond with a voltage of $-3a$. The sense amplifier would produce no output, thus indicating a match. If one of the zeroes failed to match the mis-matching core would produce a response of $-b$ and the total word response would be $-2a-b$ which is more negative than $-3a$, because $b>a$. The sense amplifier will thus produce an output indicative of a mis-match. The positive voltage response of the sense amplifier when it is positively biased will measure the mis-match for "1" interrogation.

Each word line $W_1$ through $W_n$ threading the core memory has a correspondingly connected sense amplifier $\mathbf{65_1}$ to $\mathbf{65_n}$, so that the response of each individual word to the interrogation is detected thereby. Because of the successive interrogation for zeroes and ones, and the fact that a mis-match in either voids any words as a match, the respective outputs of the sense amplifiers $\mathbf{65_1}$ to $\mathbf{65_n}$ are connected to the "0" input side of the respective flip-flops $\mathbf{66_1}$ to $\mathbf{66_n}$ which are initially reset to the "1" state by means of a timed impulse applied to the "1" input sides thereof through line $\mathbf{66_r}$. By virtue of the flip-flop action, any of the triggers, once flipped remains there until reset. Thus, at the end of the successive interrogations for zeroes and ones, the individual flip-flops 66 will store the match or non-match of each of the words in memory.

Because interrogation proceeds separately for zeroes and ones in that order, it is possible to have the following conditions as to any one word: (*a*) match on both zeroes and ones (*b*) mis-match on both zeroes and ones (*c*) match on zeroes, mis-match on ones or (*d*) mis-match on zeroes, match on ones. In data searching the nature of the response of the data to any given question has significance in guiding the choice of a subsequent question. For example in (*a*) above, if the answer to the question has been found, the data fulfilling the search criteria would obviously be read out. Were some other disposition required the question would probably not have been so posed in the first instance. If a mis-match occurs on both zeroes and ones the searcher could probably order a complete new line of questioning, or relax his standards as to both zeroes and ones so as to obtain the next best match. A unique mis-match on either ones or zeroes would probably dictate a re-questioning with relaxed standards as to the mis-matching criterion.

In FIG. 2*c* each of the flip-flops $\mathbf{66_1}$ to $\mathbf{66_n}$ has separate outputs from the "0" and "1" sides thereof. Remembering that all of these flip-flops are initially reset to the "1" state, any one so remaining will indicate that the corresponding word has registered no mis-matches. As interrogation proceeds sequently, at the end of the interrogation for zeroes any of the flip-flops 66 remaining in the "1" state will indicate that the corresponding words matched the zero interrogation. At the end of the interrogation for ones, any of the flip-flops 66 remaining in the "1" state indicate that the corresponding words matched both interrogations. In the latter instance, those matching words will be read from memory. To achieve this readout control each of the flip-flops 66 has output lines $\mathbf{66_{11}}$ to $\mathbf{66_{n1}}$ from the "1" side thereof connected as inputs to the "or" circuit 67. Any of these lines manifesting the presence of a "1" in any of the flip-flops 66 after two interrogations indicates one or more matching words, and will produce an output from "or" circuit 78 on lines $\mathbf{67_a}$. This output is sensed by a timing pulse subsequently applied to "and" gate 68, the output from which switches flip-flop 69 to the "1" state, which in turn switches flip-flop 71 to the "1" state, both flip-flops being in the reset "0" state. An output $\mathbf{71_1}$ from flip-flop 71 biases gate 72 open so as to pass readout pulses to those word lines registering a match.

Although the sequential readout of the matching words is described in detail in the above-identified co-pending appplication, it will be briefly repeated here. Once gate 72 is opened as a result of a match, pulses applied to $\mathbf{72_a}$ from a master clock source are introduced into the cascaded paired "and" circuits therebeneath in FIG. 2*c*. The right hand column of "and" circuits $\mathbf{73_1}$ to $\mathbf{73_n}$ has one input connected from the "0" output side of the corresponding flip-flops $\mathbf{66_1}$ to $\mathbf{66_n}$. The left hand column of cascaded "and" circuits $\mathbf{74_1}$ to $\mathbf{74_n}$ has one input connected from the "1" output side of the corresponding flip-flops $\mathbf{66_1}$ to $\mathbf{66_n}$. The remaining inputs from the paired "and" circuits are commoned and connected either to the output from the preceding 73 "and" gate, or in the first instance to gate 72. The output from the last "and" gate $\mathbf{73_1}$ is connected back to reset flip-flop 71. The outputs from each of the "1" "and" gates $\mathbf{74_1}$ to $\mathbf{74_n}$ is connected through a correspondingly numbered delay line $\mathbf{75_1}$ to $\mathbf{75_n}$ to the "0" side of each of the respective flip-flops $\mathbf{66_1}$ to $\mathbf{66_n}$. A forked output from each of the "and" gates 74 connects to a corresponding word line in memory.

The first of the pulses passed by gate 72 will proceed successively through all of the "and" gates 73 which are active (indicating a mis-match). The first active "and" gate 74 will accept the pulse and produce a drive pulse on the corresponding word line to read it out of memory, and also will be passed with a slight delay to set the corresponding flip-flop 66 to its "0" state before the next drive pulse is applied to gate 72. This next pulse now finds the "and" gate 74 which it just traversed closed, and the corresponding "and" gate 73 open, so as to pass the pulse to the next active line. When the pulse has traversed all the active lines and appears as an output on "and" gate $\mathbf{73_1}$, the flip-flop 71 is reset to zero through line 76, and the output from the flip-flop signals the end of readout.

Returning now to the detection of the nature of the mis-matches, it will be remembered that the "or" circuit 67 (FIG. 2*c*) produces an output if any one of the flip-flops $\mathbf{66_1}$ to $\mathbf{66_n}$ remains in its reset "1" state indicating a match condition to whatever interrogation has preceded the instant in question. One of the outputs from this "or" has already been treated. The remaining one feeds an "and" gate 77 having a timing pulse $TP-n+3$ applied thereto. This pulse is applied following the interrogation for zeroes and before the interrogation for ones. Such pulsing, if "or" circuit 67 produces an output indicating that at least one word in memory matched the interrogation for zeroes, will switch flip-flop 78 from its reset "0" status to the "1" state. Conversely, if no word matched for zeroes, the flip-flop 78 will remain in its reset "0" state. The status of flip-flop 78 at the end of interrogation for zeroes indicates whether (a) that no word matched the zero interrogation or (b) that at least one word matched the interrogation. As to the (a) condition the output **78*a* is used to select further program instructions, as will be explained, even though this is not a complete picture of the mis-match. For example, if no word matches the zero interrogation, it is possible that the no-match will repeat for ones, or that the ones will match. However, all of the flip-flops have been set in the "0" state by the mis-match for zeroes, no subsequent match or mis-match will alter their status. Obviously, if this further distinction is required, the flip-flops $66_1$ to $66_n$** can be reset between the zero and the one interrogations, so as to achieve separate registrations of the match conditions. If, the reset occurs only on mis-match of zeroes, the subsequent match or mis-match on ones will be significant, as the perfect match condition is precluded by the failure to match on zeroes.

In the event that flip-flop 78 is switched to the "1" state following a zero interrogation, this registration is open to further interpretation. Here, however, such is possible. If following the interrogation for ones, no matching word has been found, "or" gate 67 will produce no output, and the "and" gate 68, when pulsed, will not switch flip-flop 69 from its reset "0" state. Consequently output line $69_0$ will provide one input to "and" gate 79 while line $78_1$ provides the other, thus enabling the gate to produce an output on hub $79_a$ to control further question modification. Since flip-flop 78 being in the "1" state registers the fact that at least one word matches the zero interrogation, and the "0" state of flip-flop 69 registers the fact that of the words found to match for zeroes none matches for ones, then the output on hub $79_a$ registers the fact that at least one word matched for zeroes, but of these, none matched for ones.

The three conditions of match or mis-match as determined by the relativity of the memory data itself to the question posed can thus be utilized to automatically determine the future course of questioning. As has been explained a perfect match on sought zeroes and ones produces an automatic sequential output of those matching words. The no-match conditions are manifested by activation of either the hubs **78*a* or 79*a***, which hubs control the selection of further programmed questioning.

Were the flip-flops $66_1$ to $66_n$ reset after a mis-match on zeroes and between the interrogations for zeroes and ones, then the status of the flip-flops 69 at the end of the interrogation for ones would manifest the match status of the ones only. With outputs from 69 and 78 the complete mis-match picture would be presented. For example, if the outputs were combined as follows the logic results indicated would be obtained:

(a) $78a+69_0$=no-match on zeroes, no-match on ones;
(b) $78a+69_1$=no-match on zeroes, match on ones;
(c) $78_1+69_0$=match on zeroes, no-match on ones.

With these outputs it will be readily apparent from that to follow how the program can be selected to alter the interrogation as a function of the nature of the mis-match response of the memory data words to the interrogation.

*Timing*

The sequence of operations of the memory interrogation system begins with a start pulse generated by the computer 10 (FIG. 1) and delivered over the line 11 to a trigger 86 (FIG.3) which is initially reset to its "0" state. This impulse switches the trigger to its "1" conductive state, so as to produce an output potential on line $86_1$ to enable "and" gate 87 to pass clock pulses from clock source 88 to the system timing units. These units consist generally of cascaded triggers wherein each trigger primes the succeeding trigger for firing by the next following pulse. The firing of any trigger in the chain extinguishes the preceding trigger. Thus, of the triggers in the chain, one, and only one, is conductive at any one time. If the chain is closed upon itself, a continuous cycling is effected so long as stepping pulses from a master clock are applied. If the chain is open ended, an extra trigger is usually added to the beginning, and possibly the end of the chain, so as to permit the chain to be primed for the beginning of a cycle, or to activate sub-cycles of operation. The first trigger in such a timing chain is usually reset to the "1" state so as to be receptive to a cycle initiation. A trigger timing chain suitable for application herein is shown in U.S. Patent 2,658,681 to Palmer et al.

Figure 3:
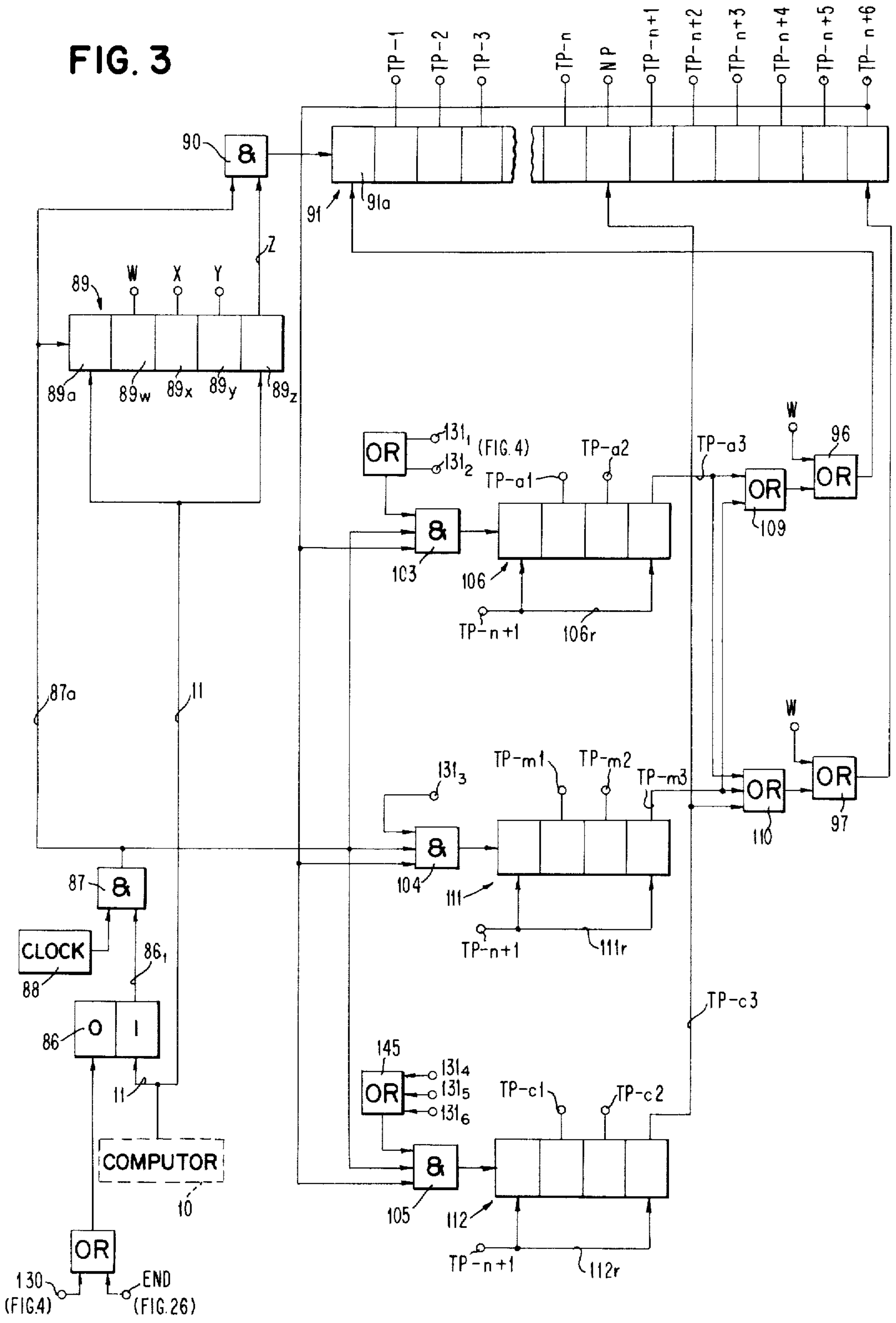
FIG. 3 is a block diagram of the components necessary to produce the relative timing.

The first clock pulse passed by gate 87 is applied over line **87*a* to the common input to timing ring 89, the first trigger thereof having been reset to a conducting state, while all other triggers in the chain are in the non-conducting state. This reset is accomplished by the start pulse received on line 11. The application of the first clock pulse will fire the second trigger 89W and extinguish the first. Firing of the second trigger 89W** produces a potential on output hub W for this pulse interval. This potential is applied to similarly symboled hubs elsewhere in the drawings as follows:

W—Resets mask control register 24 (FIG. 2*d*)
Resets associative interrogation register (AIR) 23 (FIG. 2*a*)
Resets "0" bit counter 50 and 80 (FIG. 2*d*)
Resets "1" bit counter 51 and 81 (FIG. 2*d*)
Resets no-match on zero flip-flop 78 (FIG. 2*c*)
Resets counter 126 (FIG. 4)
Resets full-match flip-flop 69 (FIG. 2*c*) through "or" gate 146
Resets program unit 26 (FIG. 4)
Resets word no-match flip-flops $66_1$ to $66_n$ (FIG. 2*c*)
Resets **91*a* to "1" through "or" gate 96** (FIG. 3)
Resets *TP—n*+6 to "0" through "or" gate 97 (FIG. 3)

Each succeeding clock pulse delivered to timing chain 89 turns off one trigger and fires the next succeeding one until the final trigger 89Z in the chain is fired. As no trigger follows this one, it remains fired until reset, and provides a constant control output independent of the application of successive clock pulses. The individual triggers in the chain 89 provide the successive control impulses to correspondingly symboled hubs as follows:

X—Energizes "or" gate 46 (FIG. 2*d*) to pass input control to "and" gate $22_1$ to $22_n$ entering data from computer 10 through input connections to the respective orders of the mask control register 24.
Y—Energizes "and" gates in 21 (FIG. 2*a*) to enter a search word from the computer into AIR 23.
Energizes gate 25 (FIG. 4) to enter program into storage 26.
Z—Remains active until reset.

With the firing of 84Z, its constantly available output activities "and" gate 90 so as to pass the clock pulses from clock 88 applied as the second input thereto. The output from "and" gate 90 is connected to timing ring 91, whose first order trigger **91*a* is initilaly conducting, and the remaining ones non-conducting. Thus the first timing pulse passed by "and" gate 90 extinguishes trigger 91*a***, and fires the succeeding one. Succeeding pulses produce a similar chain reaction firing each succeeding trigger, and extinguishing the preceding one. Each trigger is identified by its output terminal, which applies the respective timed impulse to a correspondingly symboled hub elsewhere on the diagram. The timing and its functional application will now be described.

TP–1—Enters hub TP–1 (FIG. 2*d*) where it is applied as one of the inputs to each of the respective "and" gates $52A_0$ and $52A_1$. These gates receive second inputs from the low order flip-flop **24*a* of mask control register 24. The respective third inputs to these "and" gates is from the "0" and "1" output sides of low order flip-flops $23A_0$ and $23A_1$ of AIR 23. Thus, if the first order bit is to be interrogated (24*a* is in "1" state), either a "0" or "1" will be significant, and the desired presence thereof counted in either "0" bit counter 50, or "1" bit counter 51, by gating of the timing pulse TP–1 through the energized "and" gate $52A_0$ or $52A_1$, and through the "or" gate 53 or 54**.

TP–2 to TP–*n*—The same action, above described with respect to the first order, will be sequentially repeated with respect to all subsequent orders. The respective counters 50 and 51 will now manifest the counts of the numbers of "0's" and "1's" whose presence will be sought among the memory data words.

N.P.—This produces no timing pulse that is used as such. The trigger permits intermediate re-cycling of a portion of chain 91.

*TP—n*+1—Switches flip-flop 60 (FIG. 2*e*) to the "1" state so as to manifest the count of the number of desired "0's" as a potential on line 70. This timing pulse connects the output of counter 50, through "and" gates 55 to summing amplifier 56 which produces a voltage dependent on the count in 50. This voltage is inverted in inverter 59 and fed to line 70 through now closed relay points of relay 62, driven from driver 61. This pulse also resets subcycle timing rings 106, 111, and 112 (FIG. 3).

*TP—n*+2—This timing pulse is fed to a similarly labelled hub (FIG. 2*a*) where, through the medium of "or" gate 91, it provides the interrogation for zeroes, depending on the respective statuses of "and" gates 31$a_0$, 31$b_0$, and 31$n_0$. Whichever of these gates are energized by the outputs from gates 30 will determine which of the bit lines $B_1$ to $B_n$ are energized at this time. The inverters 47 in the "0" sides of the line are active to provide an inverted interrogation signal, as the relay 48 is now normal. The interrogation signals applied selectively to the bit lines $B_1$ to $B_n$ in accordance with the status of AIR 23 and mask control register 24 will produce in the bit-storing cores in memory 32 a response indicative of the remanent state of the core relative to the zero interrogation signal. The individual responses of each bit core will be summed in the respectively coupled word lines $W_1$ to $W_n$. As line 70 was biased at time TP–1 with a voltage manifestive of the desired response of the cores on any one word line to the interrogation for the presence of zeroes, the sense amplifiers 65$_1$ through 65$_n$ will produce an output only if the voltage response of the interrogated cores on the corresponding word line is greater negatively than the preset bias, thus indicating a mis-match. The output from the respective sense amplifiers, if it occurs, will switch the flip-flops 65 from their reset "1" state to the "0" state.

*TP—n*+3—With the occurrence of this timing pulse, flip-flop 60 is reset to "0" thus removing the "0" bias from line 70. Simultaneously, the appropriate "1" bias is applied to line 70 through activation of flip-flop 63, "and" gates 57, and relay 65. So as to record the fact that the zero interrogation may have produced no matching response, this timing pulse is applied to "and" gate 77, which will, in conjunction with the output of "or" gate 67, switch flip-flop 78, provided that at least one of the word mis-match flip-flops 66$_1$ to 66$_n$ remains in its reset "1" state. The flip-flop 78 continues in the state determined at this time.

*TP—n*+4—This timing provides the interrogation for the desired presence of "1's" in the same fashion that the interrogation for "0's" proceeded at time *TP—n*+2. The only difference in operation is that different bit lines are now energized, and the bias on line 70 is a plus bias in accordance with the tabular values previously explained. The pulse is applied through "or" gate 92 (FIG. 2*a*), and the interrogation pulse passes directly into one or more of the bit lines $B_1$ to $B_n$ without inversion, as the inverters 47$a_1$ to 47$n_1$ are shunted by the normally closed relay points of relay 48. During this interrogation no bit line that had previously been interrogated will again be interrogated, as the presence of "0's" and "1's" are mutually exclusive. However, a previously mis-matching word can again mis-match, or it can match. The circuits illustrated will detect a double-match condition, as the matching word will have a corresponding flip-flop remaining in its "1" state. Thus at the end of this time interval, the "or" gate 67 will produce an output if one or more words matches both interrogations.

*TP—n*+5—At this time the word-match status of "or" circuit 67 is again interrogated by application of the timing pulse to "and" gate 68 which, if "or" gate 67 manifests a match somewhere in memory, will switch flip-flop 69 to the "1" state. If no match is found, flip-flop 69 remains in its reset "0" state. Simultaneously with this test, *TP—n*+5 is applied to trigger 63 to remove the "1" bias from line 70, and also to trigger 93, to gate a bias from battery 94, through gate 95 to line 70. This bias is such as to preclude sense amplifiers 66 from producing any output. Should the flip-flop 69 be switched at this time the output thereof will produce an impulse which is applied to energize the coil 98 of a relay (FIG. 2*b*), the points 98*e*, 98*f*, 98*g* and 98*h* are closed to ground the bit lines, the points 41*m* closed to connect the word lines to their respective readout circuits, and the points 98*a*, 98*b*, 98*c*, and 98*d* transferred to remove ground from the bit lines and connect them to output circuits. This relay is of the latch type and remains energized until subsequently de-energized. The pulse *TP—n*+5 also switches flip-flop 99 (FIG. 2*a*) to energize relay 48 through driver 100, the relay opening its normally closed points and closing its normally open points to reverse the shunt connections on the inverters 47.

*TP—n*+6—When applied to the "or" circuits 91 and 92 (FIG. 2*a*), this pulse applies to the previously interrogated cores pulses opposite in sense to those which were previously applied thereto so as to reset the cores. By virtue of the blocking potential applied at *TP—n*+5 through trigger 93 (FIG. 2*d*), the sense amplifiers are blocked from responding to this reset pulse. By this same pulse if triggers 69 and 71 have been switched to indicate a matching response of one or more words in memory, a readout of these words will be initiated. By application of this pulse to "and" gate 72 (FIG. 2*c*), and if trigger 71 is switched to "1" (indicating a match, the clock pulses from clock 88 will be gated to the first pair of readout "and" gates 73$_n$ to 74$_n$ to produce sequential readout of the matching words as above described.

Because a readout of matching words can consume from one timing increment up to a maximum of N units (N matching words) the memory cycle timing must be arrested for the requisite time. To this end the timing chain 91 has as its last trigger ***TP—n*+6**. This trigger being the last in the chain will remain "on" until reset, because no following trigger exists to extinguish it. Thus the clock pulses applied to the trigger chain have no further stepping effect thereon.

The readout of the matching words proceeds sequentially to drive each matching word line as hereinabove described. Each line is driven through a doublet pulse generator 101$_1$ to 101$_n$ which produce a positive and negative driving impulse to the desired word lines threading the core memory. Each core on the driven line responds in accordance with its remanent storage state to produce output pulses on the corresponding bit lines. These output pulses are filtered in the output register 27 by individual sense amplifiers which are pre-adjusted to produce an output signal for a signal positively in greater than the bias, or negatively greater than the negative bias, but not both. Thus the applied doublet pulse will both quiz and reset the cores. For example if a "ones" output is desired, the output sense amplifiers in register 27 will be biased with a bias of $-a$. The portion of the doublet pulse corresponding to a "0" interrogation will produce a response of $-a$ in those cores storing a "0," and a response of $-b$ in those cores storing "1's." Since the sense amplifiers are biased to a $-a$, only the "1" storing cores; will produce a response. The other half of the doublet pulse will produce responses of $+a$ or $+b$ to which the sense amplifiers are totally unresponsive.

When the matching word readout is completed, a control potential emanating from "and" gate 73$_1$ (FIG. 2*c*) will reset trigger 71 to zero, producing an output called "END." This output is utilized by means of a plurality of "one-shot" devices as follows:

END—Transmits completion of search signal to computer on line 29 (FIG. 1).

Resets trigger 86 (FIG. 3) through "or" gate 160.
Releases relay 48 by resetting flip-flop 99.
Releases relay 98 by energizing the latch-releasing coil thereof.

*Non-match sub-cycle timing*

A non-matching response to an initial interrogation permits of any one of three sub-cycles, which can modify the initial question in any one of five ways depending on the response of the data memory words to the first posed question. Deferring for the moment how the selection of the next question is to be selected the timing of the sub-cycles will now be examined.

If at time *TP—n+6* no word has been found to match the first interrogation, the triggers 69 and 78 will remain in their "0" states so that gate 68 will pass no readout pulses. *TP—n+6* however will be led also as parallel inputs to "and" gates 103, 104, and 105. By virtue of these inputs, all of these gates are potentially active to pass the clock pulses from clock 88 and gate 87. However, one, and only one, of the "and" gates is activated through its third inputs. Thus only one sub-cycle will be initiated.

*Addition or subtraction of counts to AIR*

The first sub-cycle for consideration is that which permits AIR 23 to have one added to, or subtracted therefrom. This sub-cycle requires that the mask control register 24 remains in status quo. However, since the alteration of AIR will provide a new basis for interrogation, the mis-match previously registered must be reset. Therefore, the first timing interval TP–*a*1 produced by a trigger chain 106 is applied to reset trigger 78 should it have been switched by the previous interrogations having matched on zeroes. Also reset by this timing pulse are the word mis-match flip-flops 66. The relay 48 (FIG. 2*a*) is restored to normal by TP–*a*1 applied through "or" gate 107. Since a new count of "0's" and "1's" is required, the "0" bit counter 50 and "1" bit counter 50 (FIG. 2*d*) will be reset at this time by feeding the timing pulse TP–*a*1 through "or" gate 108 to the common reset line 53 for these counters.

The second sub-cycle timing pulse TP–*a*2 gates a count of one additively or substractively into the AIR 23 by program selection to be described. AIR now contains a number one greater or one less than the original entry thereto, and, except for conditioning the timing chain 91 for a repeat cycle of operation, the system is prepared to interrogate the memory data words in accordance with a new data word with is greater than, or less than that previously employed. It will be recalled that the trigger *TP—n+6* has remained in the "1" state during the sub-cycle, and that in order to reactivate the trigger chain 91, this final trigger must be reset to "0" and the first trigger 91*a* reset to "1." To this end, the timing pulse TP–*a*3 through "or" gate 109 and "or" gate 96 serially connected the "1" side of trigger 91*a* will reset it to "1." Similarly this pulse through "or" gates 110 and 97 serially connected to the "0" side of trigger *TP—n+6* will reset it to "0." The next occurring clock pulse, finding trigger 91*a* in the "1" state, so as to prime trigger TP–1, will initiate a new cycle of timer 91. This will provide a second interrogation of memory in the same manner as previously described, which interrogation can again produce a match or mis-match. If a match exists, readout of the matching words will proceed as above-described and any subsequent interrogations will be cut off by the END signal. If no match occurs a second sub-cycle can be initiated, depending on the program.

Inasmuch as the sub-cycle timer 106 had cycled so as to leave the final trigger TP–*a*3 in a conducting condition, and the first trigger non-conducting, these triggers must be reset. Advantage may be taken of any one of the timing pulses produced by timer 91 as its cycle must obviously precede any sub-cycle. Arbitrarily therefore, *TP—n+*1 will be utilized for this purpose through application to reset line 106*r*, and also to reset lines 111*r* and 112*r* to reset the remaining sub-cycle timers 111 and 112.

*Modifying the mask data*

Upon another mis-match occurring, a second sub-cycle of operation can be initiated by the occurrence of timing pulse *TP—n+*6, a program control pulse, and a clock pulse all occurring on "and" gate 104. This will initiate a sub-cycle wherein a new entry is to be made into the mask control register 24. With successive passage of clock pulses through "and" gate 104 the sub-cycle timer 111 will cycle so as to produce outputs at each of its stages. The first pulse TP–1 will operate to reset the mask control register 24 through "or" gate 113. So too will this impulse reseat flip-flop 78, and the mis-match flip-flops $66_1$ to $66_n$. The second timing pulse (TP–*m*2) will gate new information from the computer 10 to the mask control register 24 through "or" gate 46. The third impulse reset timer 91 as previously described. With the timer 91 reset interrogation proceeds with a new "don't care" criterion applied to the same word in AIR that was used on the immediately preceding interrogation. Again a match or mis-match can result.

*Varying discrimination level*

The third variation of a sub-cycle following a prior non-matching interrogation is that wherein the bias or discrimination level is relaxed so as to permit one or more mis-matched zeroes or ones can be tolerated. In this instance the program will provide a control impulse to "and" gate 105, which at time *TP—n+*6 will be active to pass clock pulses to sub-cycle timer 112. Timer 112 has been reset at time *TP—n+*1 and will step once for each clock pulse. The first pulse TP–*c*1 resets trigger 78 and no-match flip-flops $66_1$ to $66_n$. No reset is had of AIR 23, mask control register 24, nor of the "0" and "1" bit counters 50 and 51. Also flip-flop 69 is not now reset as it remains in the "0" state by virtue of the mis-match which has initiated the sub-cycle in the first instance. Inasmuch as the "0" bit counters 50 and 80 or the "1" bit counters 51 and 81 are to have their bit count altered during this sub-cycle, neither can be reset. Nor can the significant "0" and "1" bits as manifested by AIR 23 and mask control register 24 be recounted in this cycle. Therefore, depending on the program called for by the nature of the mis-match, the timing pulse TP–*c*2 will be applied to either the lines 82 *or* 83 (FIG. 2*d*) or to 82 *and* 83. This will subtract the count of one from either 50 or 51 (or 50 and 51) and add the count of one to 80 or 81 (or 80 and 81). The question is now complete and except for resetting timer 91 the apparatus is ready to proceed to interrogate with a relaxed discrimination level. However, the basic cycle of timer 91 includes the pulses TP–1 to TP–*n* which are bit count pulses to establish the counters 50 and 51 in their requisite state. Were such to be permitted in the instant operation, these counters would manifest a false count. Therefore, the timer 91 is specially reset so as to reset the N.P. trigger to "1" and the trigger *TP—n+*6 to "0" so as to skip the TP–*n* timing pulses. This special reset is accomplished by the pulse TP–*c*3 being applied directly to the "1" side of trigger N.P., and through "or" gate 110 to the "0" side of trigger *TP—n+*6 through "or" gate 97. With N.P. reset to the "1" state at TP–*c*3, the next succeeding clock pulse from clock 88 will fire *TP—m+*1 and extinguish N.P. so as to repeat the basic cycle of timer 91 from N.P. forward, as previously described. The timer 112 is reset at *TP—n+*1.

*Logic discussion of timing*

Any one of the sub-cycles may be repeatedly called into action upon the occurrence of a succession of mis-matching interrogations. Again this is a matter of program control as will be described. The logical significance of repeated interrogations is obvious if one considers the simple example of the last sub-cycle just described. Here the discrimination level of either the "0" detection circuits or the "1" detection circuits (or both) are relaxed. Conceivably repeated interrogations could still fail to produce matches, despite the relaxed discrimination. The program could in such instance provide that, upon the first mis-match, the bit count be relaxed by one count, and for each subsequent mis-match the count be relaxed by one until six cycles, for example, were effected, and then to signal the computer that memory has failed to respond to its instructions. Insofar as the timing is concerned, however, it makes no difference whether the cycle is being executed for the first time or on a repeat basis. The "and" gates 103, 104, and 105 will execute a sub-cycle whenever the pre-requisite conditions for their respective operations exist. So too will any found match stop the search operation even though further instructions are still unexecuted.

*Program*

Several references have been made to a program unit which controls the nature of the question modification as a function of the response of the memory data words to previous questions. The various cycles of operation have been described in detail in connection with the timing description. These include:

(a) Straight interrogation with the sought data word and the mask data entered from computer storage.

(b) The addition or subtraction of a count of one to AIR 23.

(c) The introduction of additional "don't care" criteria by entering new data from the computer into mask control register 24.

(d) The relaxation of the discrimination levels for either the "0" interrogation or the "1" interrogation or both.

So also has an explanation been given as to how the apparatus manifests the different possibilities of match and mis-match. These are summarized as follows:

(a) Perfect match on both zeroes and ones. This results in a readout of the words found to have matched the interrogation.

(b) Match on zeroes, mis-match on ones—produces an output at 79*a* (FIG. 2*c*).

(c) No match on zeroes produces an output at 78*a* whether or not that mis-match is followed by a match or mis-match on ones. In this instance no word can possibly match in gross.

In order to combine the two conditions of mis-match with the five possible variations of sub-cycle routine at least ten instruction routines are required. If repetitive re-interrogation cycles are to be ordered the permutations of possible program instructions are further complicated. Therefore, the program instructions shall be limited to an arbitrary number for ease of understanding. From the explanation to follow it will be readily apparent how the program apparatus may be expanded to cover the full complement of instructions.

Each program instruction consists of three parts:

(a) The prerequisite no-match contingency, (b) The question modification to be effected, (c) The repeat cycle in which the contingency and the modification shall be applicable.

Because of the nature of the variables involved, an associative memory such as that just described, but without the variable discrimination level, is ideally suited for effecting the necessary program control. In such use there would be stored in memory as separate words the desired instruction parts as outlined above. For example the first three word bits could be allocated to the cycle number in which the instructions are to be operative, the next two bits to the nature of the mis-match and the final six bits to the sub-cycle routines to be followed for the specific cycle and mis-match involved. The first three bit positions of AIR would be connected as a reversible counter to count the cycle number as a function of the number of times $TP-n+6$ was emitted as a timing impulse, AIR being initially reset to zero. The nature of the mis-match would be entered into one of the next two bit positions of AIR and the stored program words interrogated. If no word were found the mis-match signal produced would signal an end of search to the computer. Any matching word would read out its associated program to select the sub-cycle and the control of the question modification.

Figure 4:
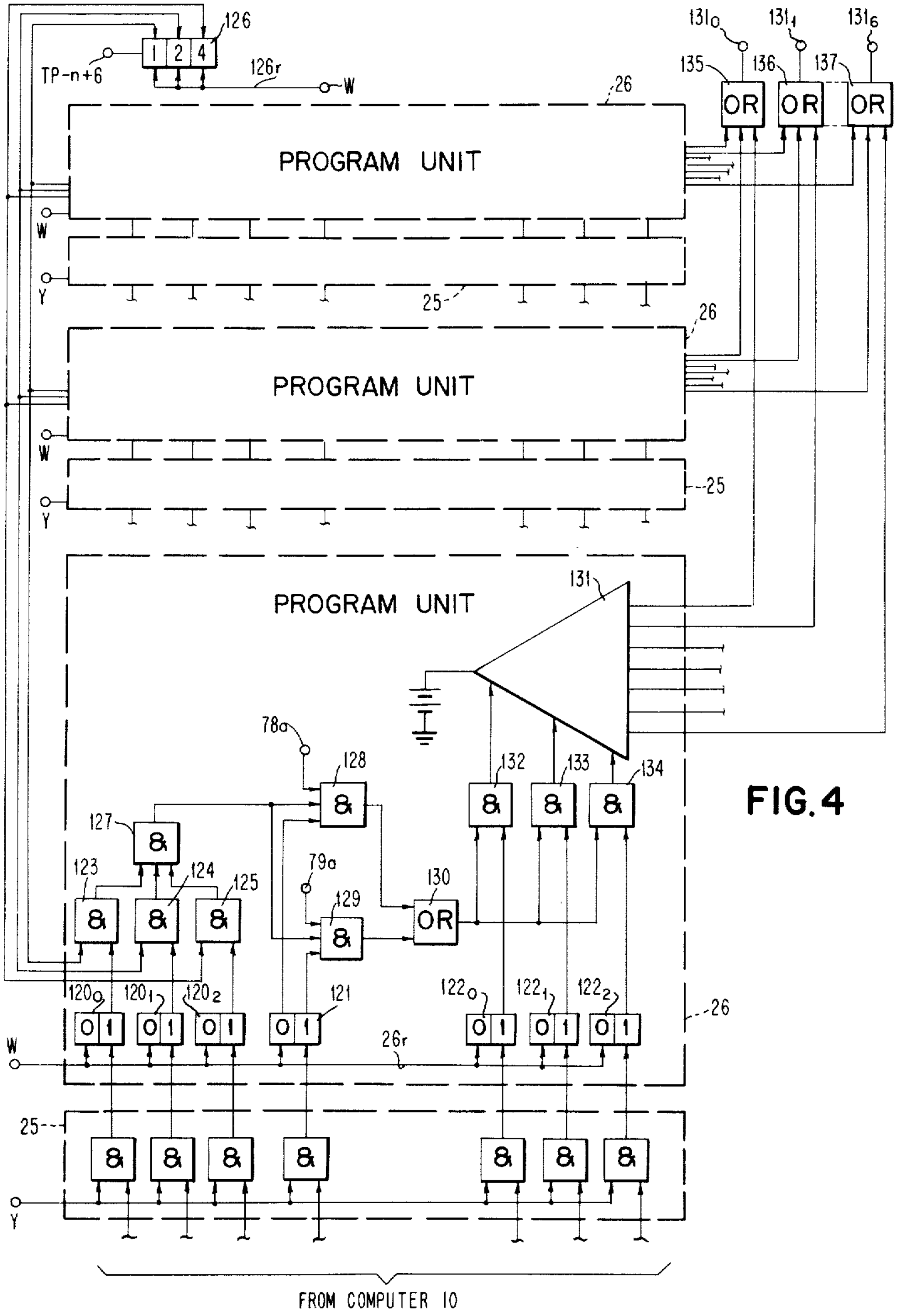
FIG. 4 shows the program storage unit and its controls.

Although the use of an associative memory for program control is certainly more flexible, the explanation thereof would require a substantial repeat of that above. Therefore, in order to simplify the understanding, a somewhat abridged program device will be described that will suffice to clarify the nature of the operations possible. Referring now to FIG. 4, the gate 25 (shown as box in FIG. 1) is repeated each containing a plurality of "and" gates, all with a commoned input Y for gating program instructions from the computer 10 at Y time in the timing cycle. There are as many possible forms which this program control can take. The one chosen for illustration includes in FIG. 4 the flip-flops $120_0$, $120_1$, $120_2$, 121, $122_0$, $122_1$, and $122_2$. These flip-flops are initially reset to zero by timing impulse W through common reset line 26*r*. The gate 25 when pulsed at Y time enters computer program instructions into the flip-flops. The circuit in the large dotted box represents one word of instructions, there being as many repetitions of this circuit as there are instruction words to be executed. The three flip-flops 120 store the cycle number in which the instructions are applicable. The flip-flop 121 stores the no-match condition which is a condition precedent, together with the cycle number, to execution of the instructions stored in the flip-flops 122 as a binary number. With the storage capacity shown any one of seven cycles can be manifested. Also any of the two conditions of mis-match can be stored. With three triggers any one of eight programs can be ordered.

The output from the "1" side of the flip-flops $120_0$, $120_1$, and $120_2$ are respectively connected as the first inputs to "and" gates 123, 124, and 125 which have as their second inputs the respective ordered "1" outputs of a cycle counter 126. This counter is initially reset to "0" by the timing impulse W applied to reset line 126*r* and counts one every occurrence of timing impulse $TP-n+6$. Since this latter impulse occurs at the end of every interrogation cycle the flip-flops 120 will always store a number of one or greater. The "and" circuits 123, 124, and 125 will all produce an output if the status of the flip-flops 120 match the count in counter 126. These three outputs are "anded" in 127 which will produce an output only if the numbers agree. The "and" circuits 123, 124, 125, and 127 therefore constitute a comparator. The output from "and" gate 127 serves as a common first input to "and" gates 128 and 129. These gates have second inputs respectively from the "0" and "1" side of flip-flop 121 which is storing the mis-match status. The third inputs 78*a* and 79*a* come from the mis-match detectors of FIG. 2*c* which register the nature of the mis-match by a potential on one, but not both, of these hubs. The outputs from 128 and 129 feed an "or" gate 130. Thus if the stored cycle value matches the count in the cycle counter 126, and if the stored mis-match indication matches the response of memory 32 to the interrogation, "or" gate 130 will produce an output. This output will now make available to the decoding "tree" 131 the binary word stored in the flip-flops 122. This is effected through the activation of "and" gates 132, 133, and 134 by the output from "or" 130 and the "1" outputs (if they exist) from flip-flops 122. Thus each word can provide only one output on tree 131, although a plurality of words can produce outputs on their respective trees during the same cycle. For example, if one wished to program a sub-cycle wherein both the zero and one discrimination levels were to be relaxed in the fourth cycle upon a mis-match on zeroes he would store as one word 100 (in 120), 1 (in 121), 101 (in 122) and as the other word in a second duplicate of the circuits shown in detail in FIG. 4 the word 100--1--110. Examination of the two binary numbers shows they agree as to those bits that are compared. Therefore, if an output occurs on 78*a* at the 4th cycle both 101 and 110 will be operable to produce a program control. Thus one word will have its fifth tree hub active while the second word will have its sixth tree hub active for programming.

With three inputs to the "tree" circuits 131 eight possible outputs are possible although they are not all used. Assuming for the purposes of illustration that the inputs are as listed, then the programmed outputs can be chosen as follows:

| Input | Output | Program |
|---|---|---|
| 000 | $131_0$ | Cease Searching and Signal. No-Match to Computer. |
| 001 | $131_1$ | Add a count of one to AIR 23. |
| 010 | $131_2$ | Subtract a count of one to AIR 23. |
| 011 | $131_3$ | Enter new "don't care" data into mask control register 24. |
| 100 | $131_4$ | Relax "0" discrimination level by one-count. |
| 101 | $131_5$ | Relay "1" discrimination level by one count. |
| 110 | $131_6$ | Relax both "0" and "1" discrimination levels. |

Realizing that all of the corresponding outputs from the trees 131 will be combined in "or" circuits, as for example 135, 136, and 137, one can now supply the missing controls in the description preceding. The outputs from the "trees" 131 shall be identified as $\mathbf{131_0}$ to $\mathbf{131_6}$ corresponding to the binary coded decimal equivalent of the foregoing inputs. The output $\mathbf{131_0}$ signalling that the memory has executed all of the interrogations without finding a match on either the initial or relaxed questions feeds "or" gate 102 (FIG. 3) to reset flip-flop 86 and stop the flow of clock pulses. Also a signal is fed on line 40 (FIG. 1) to signal the computer 10 of the failure of memory 32 to respond to the programmed interrogation. The outputs $\mathbf{131_1}$ and $\mathbf{131_2}$ are connected through an "or" gate 138 (FIG. 3) to initiate the sub-cycle timing of the timer 106 as previously described. The "count up" control $\mathbf{131_1}$ is combined with timing pulse TP–*a*2 in "and" gate 139 (FIG. 2*a*) to provide the timed impulse to add one to AIR 23. Similarly the control $\mathbf{131_2}$ is made available to AIR 23 through "and" gate 140 to combine it and timing pulse TP–*a*2 to substract one from therefrom.

New mask entry program control pulse $\mathbf{131_3}$ is connected as the previously mentioned third input to "and" gate 104 (FIG. 3) to provide the necessary energization and sequencing of timer 111. Since there is only one mask entry sub-cycle the timing pulse TP–*m*2 is the only necessary control for mask control register 24 other than the reset furnished by TP–*m*1.

The relaxation of the bias discrimination levels, on the other hand, may assume any one of three forms, even though the sub-cycle timing is identical. Since the program outputs $\mathbf{131_4}$, $\mathbf{131_5}$, and $\mathbf{131_6}$ all produce a change in one or the other of the bit counters 50, 51, 80 and 81, they must be appropriately combined. Therefore, the outputs $\mathbf{131_4}$ and $\mathbf{131_6}$ are combined in "or" gate 141 (FIG. 2*d*) the output of which is connected to "and" gate 142 which combines timing pulse TP–*c*2 with the program output control to add one to counter 80 and subtract one from counter 50 as previously described. Similarly, controls $\mathbf{131_5}$ and $\mathbf{131_6}$ are combined in "or" gate 143 which through "and" gate 144 and TP–*c*2 provides the count alteration of counters 51 and 81. As any of program controls $\mathbf{131_4}$, $\mathbf{131_5}$, or $\mathbf{131_6}$ requires a sub-cycle of timer 112, these outputs are combined in "or" circuit 145 so as to provide the requisite impulse to cycle this timer.

*Summary*

In the foregoing detailed explanation it has been shown how the search criteria were entered into the memory system along with program instructions which were to control the operation of the memory system as a function of the response of the memory data word content to the successively posed questions. The question as initially entered consisted of two parts, namely the word and the ordered significance or "don't care." The system then searches the memory content for one or more words matching the sought criteria. If a match is found, the words matching are read out to the computer, or an address generated to signal the computer where the data is located in its own memory. In either case the search is complete, and the computer is signalled. If the initial question produces no-match, then the memory system selects one or more of the stored programs in accordance with the character of the response of the data words to the initial interrogation, in an attempt to find some word matching progressively relaxed standards. Of the relaxed standards, that, wherein the system will yield words most nearly matching the data criteria is effected by selectively adjusting the bias on sensors connected to all of the word lines. This bias permits of a variable discrimination, such that the number of bits of any word mismatching the sought criteria may be adjusted. Necessarily this requires that the interrogation of the bi-stable elements storing the data bits produce a measureably different response for a match and a mis-match, so that in effect the number of mis-matches can be counted or at least the discrimination level adjusted. Although magnetic cores were chosen to illustrate the function, it will be appreciated that other bi-stable elements could be substituted therefor without departing from the spirit of the invention. Cryotrons, coupled so that their resistivity is manifestive of a mis-match, would also permit of a voltage response indicative of the number of mis-matching bits. Circuits to detect the number of resistances in the circuit provide the same sort of control as has been described with respect to cores. The program control would in such instance provide the same sort of re-questioning with relaxed standards.

While the invention has been particularly shown and described with reference to a preferred embodiment there, it will be understood by those skilled in the art that various changes in form and details may be made therein without departing from the spirit and scope of the invention.

What is claimed is:

1. A memory interrogation system comprising a memory storing the respective bits of a plurality of data words; a register storing the respective bit configurations of a word whose presence is sought among the data words; means for comparing the contents of said register with the contents of said memory and producing an analogue manifestation for each word in memory indicative of the degree of match of the word to the sought bit characteristics; means for establishing a standard analogue manifestation indicative of any given degree of match; and means for comparing the word analogue manifestations with said standard analogue manifestation and registering which of the words produced an analogue manifestation of the desired magnitude.

2. A memory interrogation system comprising a memory storing manifestations of the ordered bits of a plurality of data words; means storing manifestations of the ordered bits whose presence is sought among the data words; means for comparing the ordered bit manifestations of said register with the corresponding bit manifestations of all words in memory, and producing an analogue signal for each word indicative of the degree of match of that word to the sought bits; means for establishing a standard analogue signal indicative of the acceptable degree of match; and means for comparing the analogue signals produced by each word with said standard analogue signal to register those words producing signals indicative of an acceptable degree of match.

3. A memory interrogation system comprising a memory storing a plurality of data words; means registering the data content of those words whose presence is sought among the stored data words; means storing instructions for the progressive alterations to be made in the sought content upon the occurrence of predetermined mismatches between the sought data content and the memory data words; means for comparing the sought data content with all of the stored data words in parallel and producing a signal manifestive of the nature of the mismatch there between; and means under the control of said signal for selecting and effecting the alteration of the sought data content.

4. A memory interrogation system comprising a memory storing the respective bit manifestations of a plurality of data words; a first register storing the respective bit manifestations of a given word which partially defines interrogation criteria; a second register storing manifestations of those bit positions of said given word that shall have significance to fully define the interrogation criteria; means under the joint control of said first and second registers for comparing the respective stored bit manifestations in said first register in those bit positions manifested as being significant by said second register, with the corresponding bit manifestations of all said data words in parallel, and producing a signal upon the failure of any word to match the thus defined criteria; and means responsive to said signal for altering the contents of said first register by a predetermined amount.

5. A memory interrogation system comprising a memory storing the respective bit manifestations of a plurality of data words; a first register storing the respective bit manifestations of a given word which partially defines interrogation criteria; a second register storing manifestations of those bit positions of said given word that shall have significance to fully define the interrogation criteria; means under the joint control of said first and second register for comparing the respective stored bit manifestations in said second register with the corresponding bit manifestations of all said data words in parallel and producing a signal upon the failure of any word to match the thus defined criteria; and means responsive to said signal for entering predetermined second bit significance manifestations in said second register.

6. A memory interrogation system comprising a memory storing the respective bits of a plurality of data words; interrogation means registering the respective zero and one bits whose presence is sought among the stored data words; counting means under control of said interrogation means for counting the number of zero and one bits whose presence is sought in memory; means for controllably altering the count of zeroes by any given integer; means under control of zero and one counting means for producing first and second discriminatory electrical manifestations the respective magnitudes of which are predetermined functions of the counts of zeroes and ones, as altered; means for separately comparing the sought zero bits and the sought one bits with the corresponding stored data word bit positions in parallel, and producing first and second electrical manifestations for each data word, the respective magnitudes of which are a function of the number of bit positions matching the sought zero and one bits; discriminating means for comparing said first and second electrical manifestations produced by each word respectively with said first and second discriminatory manifestations; means under control of said discriminating means for registering those words whose zero and one bit electrical manifestations match the respective discriminatory manifestations; and means under control of the match registering means for effecting the readout of the total data content of those words registering a match.

7. A memory interrogation system comprising a memory storing the respective bits of a plurality of data words; interrogation means registering the respective zero and one bits whose presence is sought among the stored data words; counting means under control of said interrogation means for counting the number of zero and one bits whose presence is sought in memory; means for controllably altering the count of ones by any given integer; means under control of zero and one counting means for producing first and second discriminatory electrical manifestations the respective magnitudes of which are predetermined functions of the counts of zeroes and ones, as altered; means for separately comparing the sought zero bits and the sought one bits with the corresponding stored data word bit positions in parallel, and producing first and second electrical manifestations for each data word, the respective magnitudes of which are a function of the number of bit positions matching the sought zero and one bits; discriminating means for comparing said first and second electrical manifestations produced by each word respectively with said first and second discriminatory manifestations; means under control of said discriminating means for registering those words whose zero and one bit electrical manifestations match the respective discriminatory manifestations; and means under control of the match registering means for effecting the readout of the total data content of those words registering a match.

8. A memory interrogation system comprising a memory storing the respective bits of a plurality of data words; interrogation means registering the respective zero and one bits whose presence is sought among the stored data words; counting means under control of said interrogation means for counting the number of zero and one bits whose presence is sought in memory; means for controllably altering the count of both zeroes and ones by any given integer; means under control of zero and one counting means for producing first and second discriminatory electrical manifestations the respective magnitudes of which are predetermined functions of the counts of zeroes and ones, as altered; means for separately comparing the sought zero bits and the sought one bits with the corresponding stored data word bit positions in parallel, and producing first and second electrical manifestations for each data word, the respective magnitudes of which are a function of the number of bit positions matching the sought zero and one bits; discriminating means for comparing said first and second electrical manifestations produced by each word respectively with said first and second discriminatory manifestations; means under control of said discriminating means for registering those words whose zero and one bit electrical manifestations match the respective discriminatory manifestations; and means under control of the match registering means for effecting the readout of the total data content of those words registering a match.

9. A memory interrogation system comprising a memory storing a plurality of data words, the characteristic of which are manifested by the respective stability states of a plurality of bi-stable bit storage elements; interrogation means registering the characteristics of the data words whose presence is sought among the stored data words; means under control of said interrogation means for producing discriminatory electrical manifestations, the magnitudes of which are a function of the number of zeroes and ones whose presence is sought in memory, and the number of zeroes and ones that will be accepted as a nearest-match criterion; means for comparing the characteristic of the sought data word with those of the stored data words and producing an electrical manifestation for each word, the respective magnitudes of which are a function of the response of the word to the sought characteristics; and means for comparing said discriminatory electrical manifestations with the electrical manifestations produced by each word, and for registering those words whose electrical manifestations indicate an acceptable match.

10. A memory interrogation system comprising; a memory storing a plurality of data words, the characteristics of which are manifested by the respective stability states of a plurality of bi-stable bit storage elements; interrogation means manifesting the characteristics of the data words whose presence is sought among the stored data words; means under control of said interrogation means for producing discriminatory electrical manifestations, the magnitudes of which are a function of the number of zeroes and ones whose presence is sought among the stored data words; means under control of said interrogation means for interrogating said stored data words for the presence of zeroes and ones, and for producing an electrical manifestation for each word, the respective magnitudes of which are a function of the degree of match of the word to the sought data characteristics; and means for comparing said discriminatory electrical manifestations with the electrical manifestations produced by each word, and for registering a match with the sought data characteristics.

11. A memory interrogation system comprising a memory storing a plurality of bits constituting ordered data words; a register storing the ordered bit characteristics of a word whose presence is sought among the data words; means for comparing the contents of said register with the bits of all data words in parallel and producing an analogue electrical manifestation for each word indicative of the degree of match of the word bits to the sought bit characteristics; means under control of said register for producing an analogue manifestation the magnitude of which is equal to the desired analogue response of any word to the comparison; and means for comparing the analogue manifestation produced by each word line with the analogue manifestation produced under the control of said register and operative to register those words whose analogue signals indicate the desired response.

12. A memory interrogation system comprising a memory storing the respective bits of a plurality of data words; interrogation means registering the respective zero and one bits whose presence is sought among the stored data words; means under the control of said interrogation means for counting the number of zero and one bits whose presence is sought in memory and producing first and second discriminatory electrical manifestations whose respective magnitudes are predetermined functions of the numbers of sought zeroes and ones; means for comparing the sought zero bits with the corresponding stored data word bit positions in parallel, and producing a first electrical manifestation for each data word, the magnitude of which manifestation is a function of the number of bit positions matching the sought zero bits; means for comparing the sought one bits with the corresponding stored data word bit positions in parallel, and producing a second electrical manifestation for each data word, the magnitude of which manifestation is a function of the number of bit positions matching the sought one bits; discriminating means for comparing said first and second electrical manifestations produced by each word with said first and second discriminatory electrical manifestations; means under control of said discriminating means for registering those words whose zero and one bit electrical manifestations match the respective discriminatory manifestations; and means under control of the match registering means for effecting the read out of the total data content of those words registering a match.

References Cited by the Examiner

UNITED STATES PATENTS

| | | | |
|---|---|---|---|
| 2,873,439 | 2/1959 | Lahti et al. | 340—347 |
| 2,973,508 | 2/1961 | Chadurjian | 340—174 |
| 3,031,650 | 4/1962 | Koerner | 340—174 |

OTHER REFERENCES

Pages 153–187, 1960, publication I; Yovits & Cameron, Self-Organizing Systems "A Variety of Intelligent Learning in a General Problem Solver," Newell, Shaw and Simon (Pergamon Press, New York).

ROBERT C. BAILEY, *Primary Examiner.*

IRVING L. SRAGOW, MALCOLM A. MORRISON, *Examiners.*